US012598399B2

(12) United States Patent
Kannan et al.

(10) Patent No.: US 12,598,399 B2
(45) Date of Patent: Apr. 7, 2026

(54) IMAGE SYNCHRONIZATION FOR MULTIPLE IMAGE SENSORS

(71) Applicant: Apple Inc., Cupertino, CA (US)

(72) Inventors: Arun Kannan, Mountain View, CA (US); Dario A. Aranguiz, Lafayette, CO (US); Mohamed Al Sharnouby, Cupertino, CA (US); Rajiv Kumar, San Francisco, CA (US); Rohan Sanjeev Patil, Sunnyvale, CA (US); Varadharajan Chandran, San Jose, CA (US); Venu M. Duggineni, San Jose, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 18/367,432

(22) Filed: Sep. 12, 2023

(65) Prior Publication Data

US 2024/0244336 A1    Jul. 18, 2024

Related U.S. Application Data

(60) Provisional application No. 63/464,937, filed on May 8, 2023, provisional application No. 63/439,575, filed on Jan. 17, 2023.

(51) Int. Cl.
H04N 23/90        (2023.01)
G06V 10/44        (2022.01)

(52) U.S. Cl.
CPC ............. H04N 23/90 (2023.01); G06V 10/44 (2022.01)

(58) Field of Classification Search
CPC ............................... H04N 23/90; G06V 10/44
USPC ......................................................... 348/159
See application file for complete search history.

(56) References Cited

U.S. PATENT DOCUMENTS

| | | | |
|---|---|---|---|
| 10,769,446 B2 | 9/2020 | Chang et al. | |
| 10,771,669 B1 * | 9/2020 | Balasubramanian ... | G01S 17/87 |
| 10,922,888 B2 * | 2/2021 | Cherukuri ........... | H04N 13/122 |
| 10,997,425 B2 | 5/2021 | Chang et al. | |
| 11,120,266 B2 * | 9/2021 | Rabinovich ........... | A63F 13/213 |
| 11,380,101 B2 | 7/2022 | Chang et al. | |
| 2015/0127284 A1 * | 5/2015 | Seshan ................... | G01D 21/00 |
| | | | 702/89 |

* cited by examiner

*Primary Examiner* — John W Miller
*Assistant Examiner* — Omer Khalid
(74) *Attorney, Agent, or Firm* — BAKERHOSTETLER

(57)        ABSTRACT

Aspects of the subject technology may provide time-synchronized image frames from multiple cameras to various system and/or application processes running on an electronic device. In one or more implementations, a frame identifier may be determined for each image frame from each camera based on a system pulse associated with the capture of the image frame. By generating frame identifiers based for images from multiple cameras based on a centralized source such as the system pulses, subsequent processes can immediately identify images from multiple cameras having the same frame identifier for co-processing of those images.

24 Claims, 11 Drawing Sheets

500

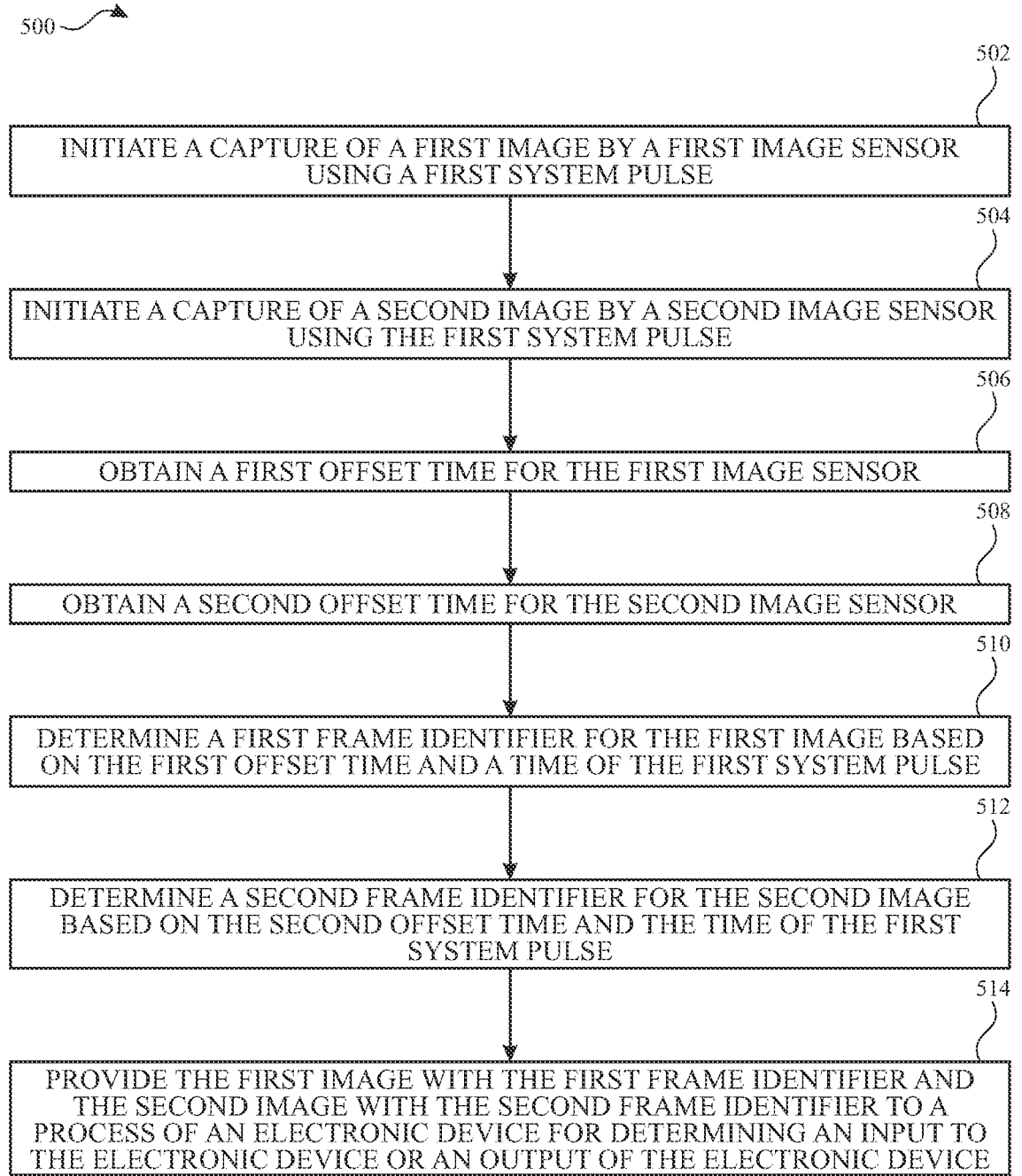

502

INITIATE A CAPTURE OF A FIRST IMAGE BY A FIRST IMAGE SENSOR USING A FIRST SYSTEM PULSE

504

INITIATE A CAPTURE OF A SECOND IMAGE BY A SECOND IMAGE SENSOR USING THE FIRST SYSTEM PULSE

506

OBTAIN A FIRST OFFSET TIME FOR THE FIRST IMAGE SENSOR

508

OBTAIN A SECOND OFFSET TIME FOR THE SECOND IMAGE SENSOR

510

DETERMINE A FIRST FRAME IDENTIFIER FOR THE FIRST IMAGE BASED ON THE FIRST OFFSET TIME AND A TIME OF THE FIRST SYSTEM PULSE

512

DETERMINE A SECOND FRAME IDENTIFIER FOR THE SECOND IMAGE BASED ON THE SECOND OFFSET TIME AND THE TIME OF THE FIRST SYSTEM PULSE

514

PROVIDE THE FIRST IMAGE WITH THE FIRST FRAME IDENTIFIER AND THE SECOND IMAGE WITH THE SECOND FRAME IDENTIFIER TO A PROCESS OF AN ELECTRONIC DEVICE FOR DETERMINING AN INPUT TO THE ELECTRONIC DEVICE OR AN OUTPUT OF THE ELECTRONIC DEVICE

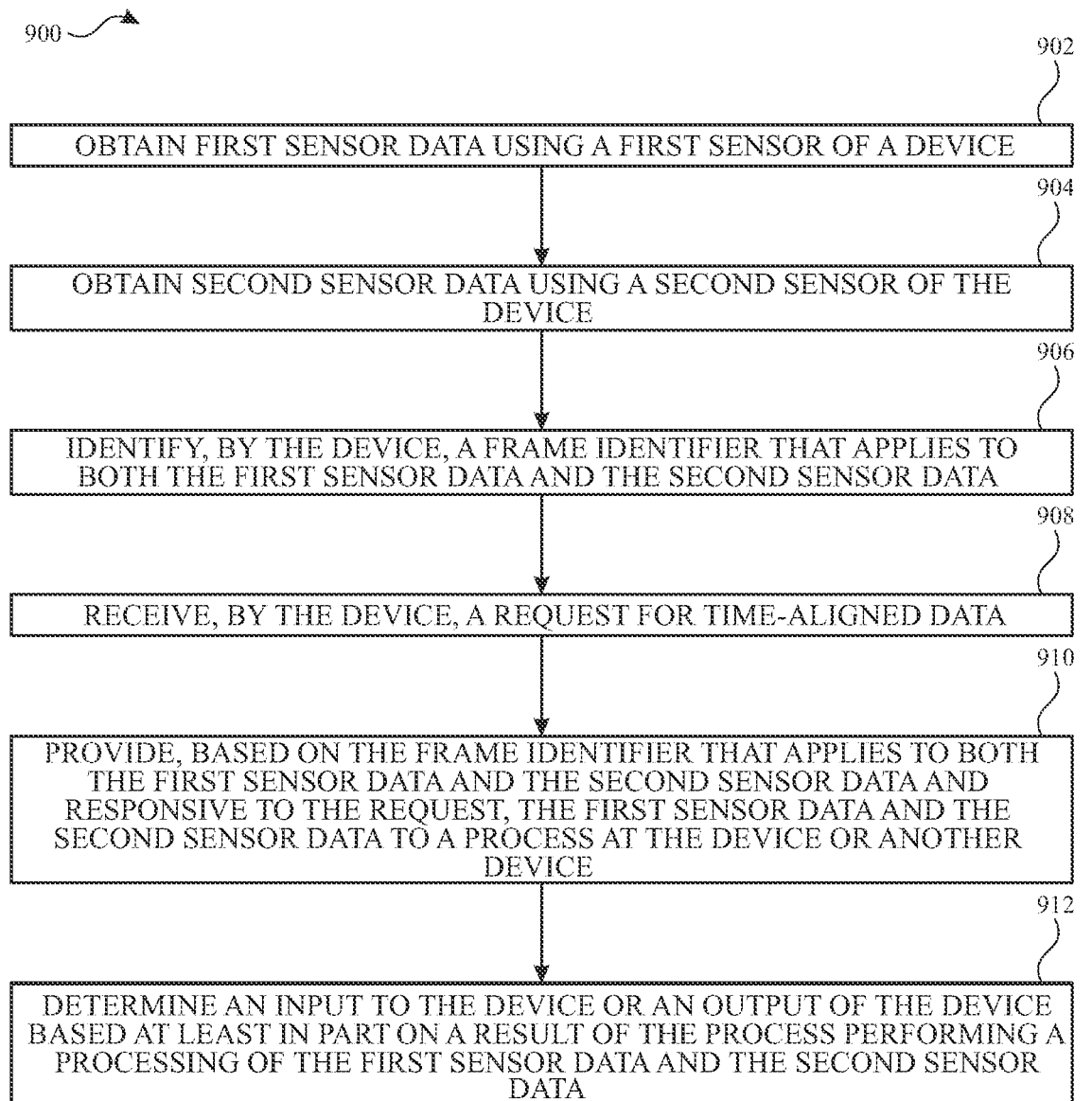

OBTAIN FIRST SENSOR DATA USING A FIRST SENSOR OF A DEVICE

904

OBTAIN SECOND SENSOR DATA USING A SECOND SENSOR OF THE DEVICE

906

IDENTIFY, BY THE DEVICE, A FRAME IDENTIFIER THAT APPLIES TO BOTH THE FIRST SENSOR DATA AND THE SECOND SENSOR DATA

908

RECEIVE, BY THE DEVICE, A REQUEST FOR TIME-ALIGNED DATA

910

PROVIDE, BASED ON THE FRAME IDENTIFIER THAT APPLIES TO BOTH THE FIRST SENSOR DATA AND THE SECOND SENSOR DATA AND RESPONSIVE TO THE REQUEST, THE FIRST SENSOR DATA AND THE SECOND SENSOR DATA TO A PROCESS AT THE DEVICE OR ANOTHER DEVICE

912

DETERMINE AN INPUT TO THE DEVICE OR AN OUTPUT OF THE DEVICE BASED AT LEAST IN PART ON A RESULT OF THE PROCESS PERFORMING A PROCESSING OF THE FIRST SENSOR DATA AND THE SECOND SENSOR DATA

*FIG. 9*

IMAGE SYNCHRONIZATION FOR MULTIPLE IMAGE SENSORS

CROSS REFERENCE TO RELATED APPLICATIONS

This application claims the benefit of priority to U.S. Provisional Patent Application No. 63/439,575, entitled, "Image Synchronization for Multiple Image Sensors", filed on Jan. 17, 2023, and U.S. Provisional Patent Application No. 63/464,937, entitled, "Image Synchronization for Multiple Image Sensors", filed on May 8, 2023, the disclosure of each which is hereby incorporated herein in its entirety.

TECHNICAL FIELD

The present description relates generally to electronic imaging, including, for example, image synchronization for multiple image sensors.

BACKGROUND

Electronic devices are often provided with a camera for capturing images. Captured image from the camera can be stored in memory of the electronic device, sent to other electronic devices, and/or used to detect objects such as face of a user of the electronic device.

BRIEF DESCRIPTION OF THE DRAWINGS

Certain features of the subject technology are set forth in the appended claims. However, for purpose of explanation, several embodiments of the subject technology are set forth in the following figures.

FIG. 5 illustrates an example process that may be performed for providing image synchronization for multiple cameras, in accordance with one or more implementations.

FIG. 9 illustrates an example process that may be performed for operating an electronic device based on sensor data from multiple sensors having synchronized frame identifiers, in accordance with one or more implementations.

DETAILED DESCRIPTION

Figure 1:
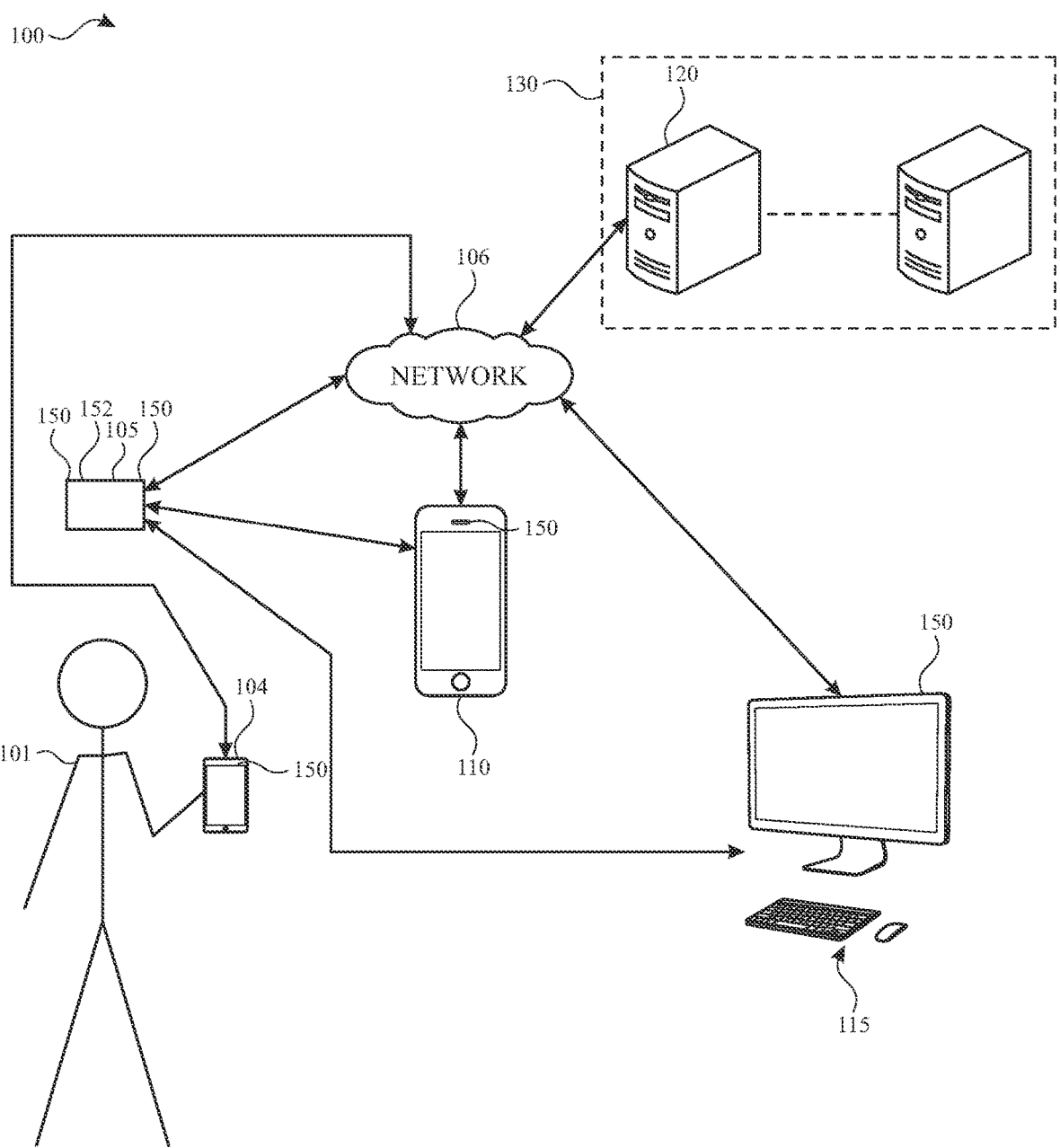
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Aspects of the subject technology may provide time-synchronized image frames from multiple cameras (e.g., multiple image sensors) to various system and/or application processes running on an electronic device. In one or more implementations, a frame identifier may be determined for each image frame from each camera based on a time of a system pulse that triggered the capture of the image frame. The frame identifier for an image frame from a camera may be determined based on the time of the system pulse, and based on an offset time for that camera. The offset time for a camera may be predetermined (e.g., prior to image capture) based on a known exposure time and readout time for that camera. Determining a frame identifier in this way may, for example, reduce the use of processing, memory, and/or power resources that can be consumed by application and/or system processes that would otherwise each individually determine image frame synchronization based on image frame time stamps, and/or may mitigate or eliminate frame synchronization uncertainty and variations that can result from performing image frame synchronization based on image frame time stamps at various individual application and/or system processes.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 may be implemented, for example, as a tablet device, a smartphone, or as a head mountable portable system (e.g., worn by a user 101). The electronic device 105 includes a display system capable of presenting a visualization of an extended reality environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150 (e.g., visible light cameras, infrared cameras, etc.) For example, the electronic device 105 may include multiple cameras 150. For example, the multiple cameras 150 may include a left facing camera, a front facing camera, a right facing camera, a down facing camera, a left-down facing camera, a right-down facing camera, an up facing camera, and/or other cameras. Each of the cameras 150 may include one or more image sensors (e.g., charged coupled device (CCD) image sensors, complementary metal oxide semiconductor (CMOS) image sensors, or the like).

Further, the electronic device 105 may include various sensors 152 including, but not limited to, other cameras, other image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User inputs detected by such sensors and/or hardware elements may correspond to, for example, various input modalities. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. In one or more implementations, facial tracking, gaze tracking, hand tracking, gesture tracking, object tracking, and/or physical environment mapping processes (e.g., system processes and/or application processes) may utilize images (e.g., image frames) captured by one or more image sensors of the cameras 150 and/or the sensors 152.

In one or more implementations, the electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner. In an example, the electronic device 105 provides a rendering of a scene corresponding to the extended reality environment that can be perceived by the user and interacted with in a real-time manner, such as a host environment for a group session with another user. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The network 106 may communicatively (directly or indirectly) couple, for example, the electronic device 105, the electronic device 110, and/or the electronic device 115 with each other device and/or the server 120. In one or more implementations, the network 106 may be an interconnected network of devices that may include, or may be communicatively coupled to, the Internet.

The electronic device 110 may include one or more cameras 150 (e.g., multiple cameras 150) and may be, for example, a smartphone, a portable computing device such as a laptop computer, a companion device (e.g., a digital camera, headphones), a tablet device, a wearable device such as a watch, a band, and the like, or any other appropriate device that includes, for example, one or more speakers 211, a touchscreen, and/or a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device. In one or more implementations, the electronic device 110, the handheld electronic device 104, and/or the electronic device 105 may be, and/or may include all or part of, the electronic system discussed below with respect to FIG. 6. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer having one or more cameras 150 (e.g., multiple cameras 150). The electronic device 115 may be, and/or may include all or part of, the electronic system discussed below with respect to FIG. 6.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
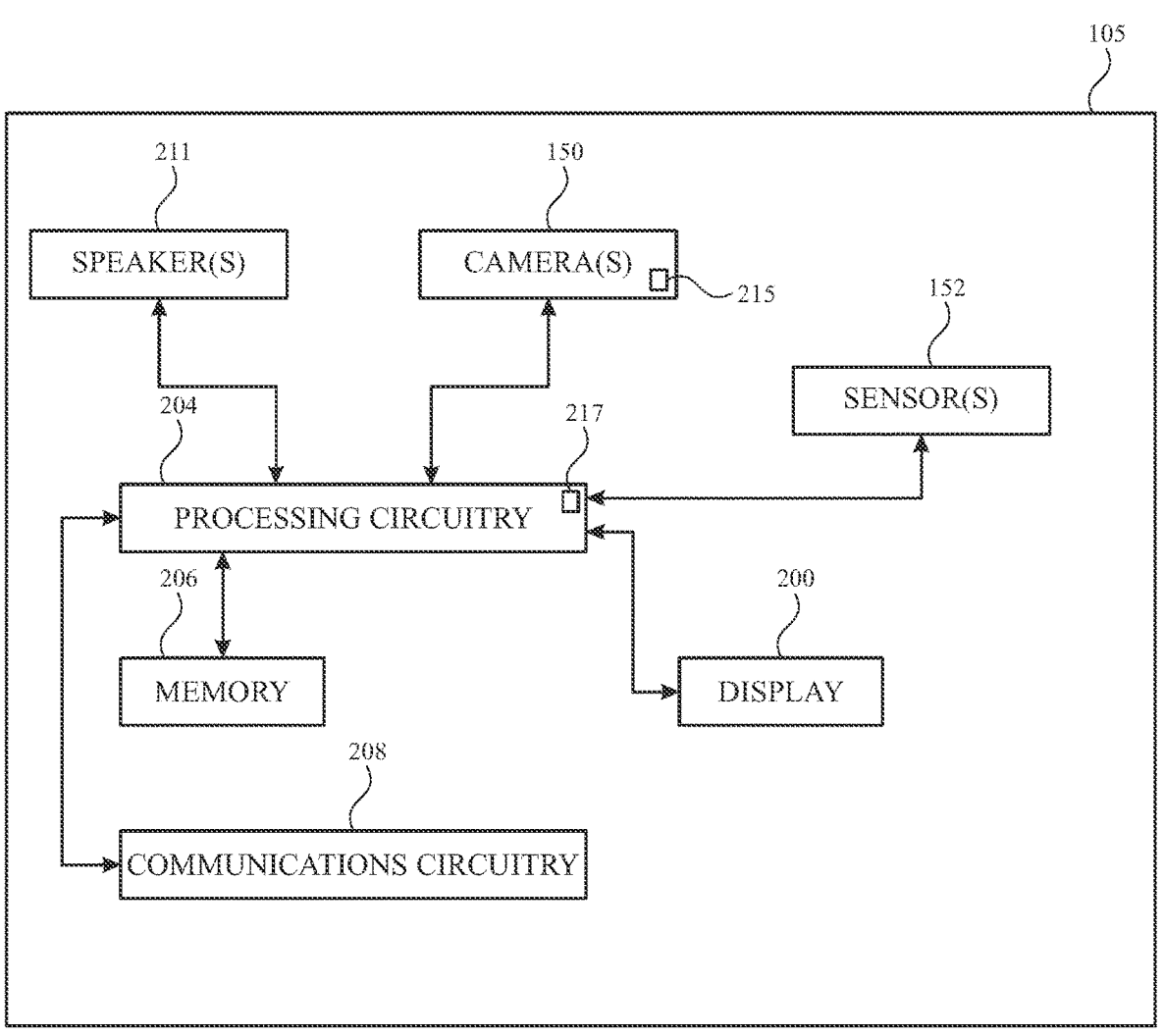
FIG. 2 illustrates a block diagram of example features of an electronic device in accordance with one or more implementations.

FIG. 2 illustrates a block diagram of various components that may be included in electronic device 105, in accordance with aspects of the disclosure. As shown in FIG. 2, electronic device 105 may include one or more cameras such as camera(s) 150 (e.g., multiple cameras 150) that capture images and/or video of the physical environment around the electronic device, one or more sensors 152 that obtain environment information (e.g., depth information) associated with the physical environment around the electronic device 105. Sensors 152 may include depth sensors (e.g., time-of-flight sensors, infrared sensors, radar, sonar, lidar, etc.), one or more microphones, and/or other types of sensors for sensing the physical environment. For example, one or more microphones included in the sensor(s) 152 may be operable to capture audio input from a user of the electronic device 105, such as a voice input corresponding to the user speaking into the microphones. In the example of FIG. 2, electronic device 105 also includes communications circuitry 208 for communication with electronic device 110, electronic device 115, servers 120, and/or other devices and/or systems in some implementations. Communications circuitry 208 may include radio frequency (RF) communications circuitry for detecting radio frequency identification (RFID) tags, Bluetooth Low Energy (BLE) communications circuitry, other near-field communications (NFC) circuitry, WiFi communications circuitry, cellular communications circuitry, and/or other wired and/or wireless communications circuitry.

As shown, electronic device 105 includes processing circuitry 204 (e.g., one or more processors and/or integrated circuits) and memory 206. Memory 206 may store (e.g., temporarily or permanently) content generated by and/or otherwise obtained by electronic device 105. In some operational scenarios, memory 206 may temporarily store images of a physical environment captured by camera(s) 150, depth information corresponding to the images generated, for example, using a depth sensor of sensors 152, meshes corresponding to the physical environment, virtual objects such as virtual objects generated by processing circuitry 204 to include virtual content, and/or virtual depth information for the virtual objects. Memory 206 may store (e.g., temporarily or permanently) intermediate images and/or information generated by processing circuitry 204 for combining the image(s) of the physical environment and the virtual objects and/or virtual image(s) to form, e.g., composite images for display by display 200, such as by compositing one or more virtual objects onto a pass-through video stream obtained from one or more of the cameras 150.

Memory 206 may store predetermined offset times for each of one or more cameras 150. For example, the offset time for each camera 150 may be predetermined (e.g., prior to capturing images with that camera) based on a known (e.g., predetermined) exposure time and a known (e.g., predetermined) readout time for that camera (e.g., for an image sensor 215 of the camera 150). In one or more implementations, cameras 150 may include fixed frequency cameras that capture images with a fixed period or cadence, and/or variable frame rate cameras that capture images with variable periods or cadences (e.g., responsive to changes in ambient lighting and/or device mode of operation).

As shown, the electronic device 105 may include one or more speakers 211. The speakers may be operable to output audio content, including audio content stored and/or generated at the electronic device 105, and/or audio content received from a remote device or server via the communications circuitry 208.

Memory 206 may store instructions or code for execution by processing circuitry 204, such as, for example operating system code corresponding to an operating system installed on the electronic device 105, and application code corresponding to one or more applications installed on the electronic device 105. The operating system code and/or the application code, when executed, may correspond to one or more operating system level processes and/or application level processes, such as processes that support capture of images, synchronization of captured images, and/or determination of inputs to the electronic device 105 and/or outputs (e.g., display content on display 200) from the electronic device 105 based on synchronized images from multiple cameras 150. As shown, the processing circuitry 204 may include one or more oscillators 217 that generate system pulses that can be used to trigger operation of other hardware and/or software processes of the electronic device 105, such as to trigger initiation of a capture of an image using one or more of the cameras 150 of the electronic device 105.

In accordance with aspects of the subject technology, the electronic device 105 may determine frame identifiers for each of multiple images captured by each of multiple cameras 150 at the electronic device 105. The frame identifiers may then be used by the same and/or different application and/or operating system processes at the electronic device 105 (and/or another electronic device) to synchronize processing of the captured images from the multiple cameras. The frame identifiers may be based on the system pulses generated by the one or more oscillators 217. In this way, images captured by various different cameras and/or image sensors at substantially similar times can be provided with the same (e.g., system-pulse-based) frame identifier, and the subsequent process(es) can operate on time-aligned images (e.g., images with the same frame identifier).

For example, in one or more implementations, the frame identifier for an image may be set to an identifier of the system pulse that triggered capture of the image. In these implementations, all images for which capture was triggered by the same system pulse will have the same frame identifier (e.g., irrespective of different exposure times, readout times, and/or delays between triggering the capture of the image and initiating capture of the image). In one or more other implementations, the electronic device 105 may determine a frame identifier for an image based on an offset time for that camera, and based on a time of a system pulse (e.g., from the oscillator 217) that triggered initiation of the capture of the image by that camera. For example, the offset time may be based on (e.g., may be a sum of) a delay time between the time of the system pulse and initiation of image capture, an exposure time for the image, and/or a readout time of the camera. In one or more implementations, a frame identifier for an image from a camera may be set to the identifier of a system pulse that occurs at or near a mid-exposure time for the image (e.g., determined based on the time of the triggering system pulse for that image and a predetermined offset between trigger and mid-exposure for that camera).

Figure 3:
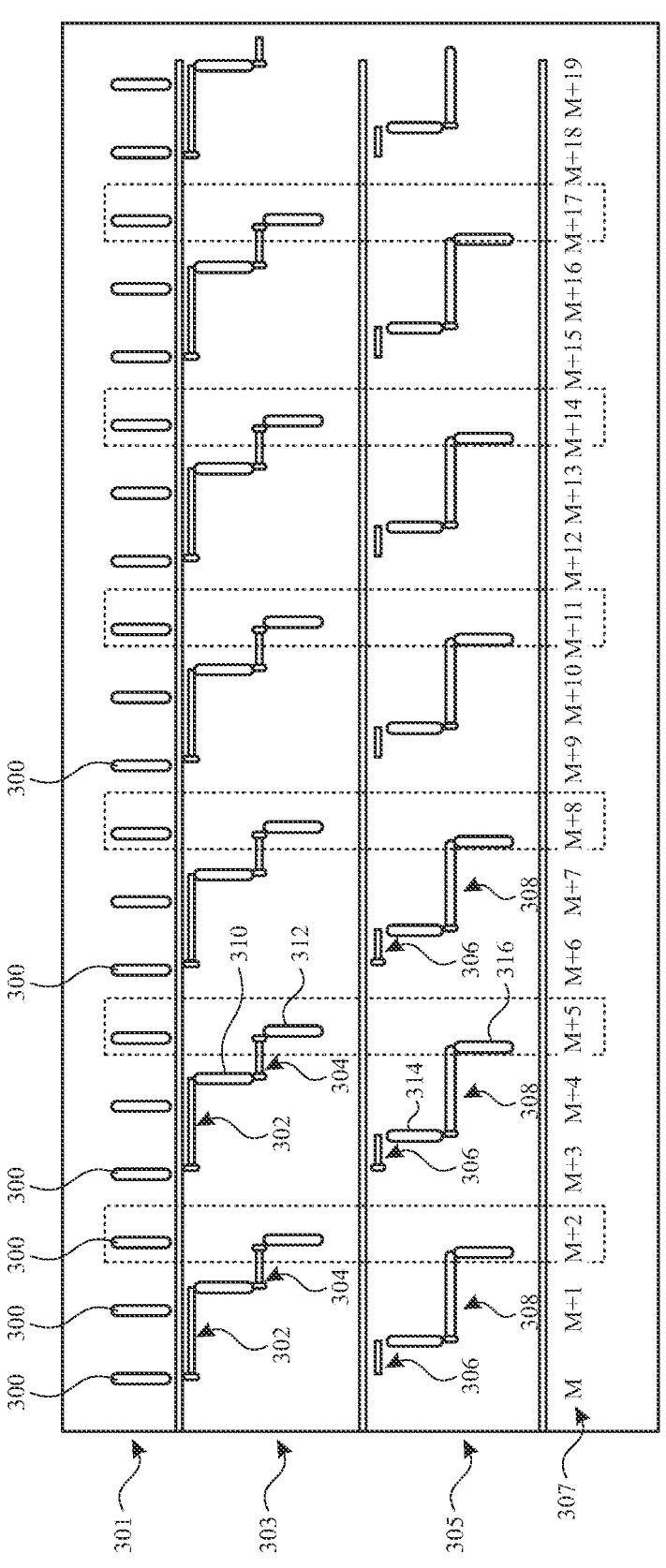
FIG. 3 illustrates a schematic timing diagram illustrating system pulses and various offsets for various cameras in accordance with one or more implementations.

FIG. 3 illustrates an example timing diagram showing aspects of image capture and frame identification in accordance with one or more implementations of the subject technology. As shown in FIG. 3, an electronic device (e.g., system circuitry, such as processing circuitry 204, including oscillator 217) may generate a series 301 of (e.g., regularly spaced) system pulses 300. As shown, each of the system pulses 300 may be associated with a value 307 (e.g., a monotonically increasing value, such as M, M+1, M+2, etc.).

The system pulses 300 may be provided to any of various other components and/or processes of an electronic device, and can be used to trigger operations by those other components. For example, the system pulses 300 may be used by one or more (e.g., multiple) cameras 150 of an electronic device, such as the electronic device 105, to trigger initiation of a capture of an image by that camera 150 (e.g., by an image sensor 215 of the camera).

In the example of FIG. 3, a timeline 303 corresponding to a first camera 150 (e.g., a first image sensor 215) and a timeline 305 corresponding to a second camera 150 (e.g., a second image sensor 215) are shown. In this example, timeline 303 and timeline 305 show first and second cameras each initiating capture of an image (e.g., an image frame) responsive to every fourth system pulse 300. In this example, both of the illustrated cameras capture images at regular intervals. However, this is merely illustrative. In other use cases, one or more cameras 150 of an electronic device such as electronic device 105 may capture images at intervals different from other cameras, and/or at varying intervals (e.g., with multiple fixed intervals interleaved with each other, or with intervals that vary responsive to varying ambient light conditions and/or operational modes of the electronic device).

As shown in FIG. 3, following initiation of a capture of an image (e.g., responsive to a system pulse 300), the first camera (corresponding to the timeline 303) may expose the pixels of the image sensor for an exposure time 302, and may then read out the resulting values (e.g., resulting charges) of the pixels of the image sensor over the course of a subsequent readout time 304. In this example, the image exposure of the first camera is complete at a completion time 310 and the image is available (e.g., for output to one or more other processes of the electronic device or another electronic device, following the readout time 304) at an output time 312. The second camera corresponding to the timeline 305 may expose the pixels of a second image sensor of the second camera for an exposure time 306, and may then read out the resulting values (e.g., resulting charges) of the pixels of the second image sensor of the course of a subsequent readout time 308. In this example, the image exposure of the second camera is complete at a completion time 314 and the read out image is available (e.g., for output to one or more other processes of the electronic device or another electronic device) at an output time 316. In the example of FIG. 3, the exposure time for each of the cameras begins at the time of the system pulse 300 that triggers the capture of an image by that camera. In one or more other implementations and/or use cases, the exposure time for one or more of the cameras can begin at a time that is later than the time of the system pulse 300 that triggers the capture of an image by that camera (e.g., later by a predetermined delay time for that camera). In one or more implementations and/or use cases, the exposure time triggered by a system pulse may be split (e.g., with a first portion of the exposure time being separated by a time gap from a second portion of the exposure time).

As described herein, in various use cases (e.g., hand tracking, gesture tracking, object tracking, scene mapping, or the like), one or more application processes and/or one or more system processes at the electronic device 105 or another electronic device may benefit from being able to use synchronized sets of images captured by the first camera (corresponding to the timeline 303) and the second camera (corresponding to the timeline 305). For example, the application and/or system processes may co-process images from the first camera that were captured at or around the same time as images from the second camera (e.g., internally to that process, and/or along with other application and/or system processes using the same images).

For example, one system process may perform gesture detection using synchronized images from multiple cameras, and another system process may perform scene mapping using the same synchronized images from the multiple cameras. In one or more use cases, the scene mapping and the gesture detection may be concurrently used by an application to generate display content for display by the electronic device. As discussed in further detail hereinafter, one or more processes at the electronic device 105 may use one or more images, and the result or output of one or more earlier processes that operated on the same one or more images, to operate the device (e.g., to determine inputs and/or outputs for the device).

As indicated in the example of FIG. 3, the image frames from both the first camera (corresponding to the timeline 303) and the second camera (corresponding to the timeline 305) are readout and output from the sensor at around the times of the system pulses 300 corresponding to the values M+2, M+5, M+8, M+11, M+14, M+17, etc. Accordingly, in the example of FIG. 3, the images from the first camera (corresponding to the timeline 303) and the images from the second camera (corresponding to the timeline 305) may be provided with frame identifiers corresponding to the values 307 of M+2, M+5, M+8, M+11, M+14, M+17 (e.g., the values at or near which those images are readout and available). In this way, one or more subsequent processes at an electronic device can determine, for example, that the images from the first and second cameras having the frame identifier M+2, the images from the first and second cameras having the frame identifier M+5, the images from the first and second cameras having the frame identifier M+8, the images from the first and second cameras having the frame identifier M+11, the images from the first and second cameras having the frame identifier M+14, and the images from the first and second cameras having the frame identifier M+17 are respectively synchronized with each other. In one or more implementations, the images from the first and second cameras (first and second image sensors) may also be provided with identifiers (e.g., sensor identifiers and/or camera identifiers) that allow subsequent processes to differentiate images with the same frame identifier from different cameras and/or image sensors. In one or more implementations, a subsequent process at the electronic device 105 may request images, from the first and second cameras, that were captured at substantially the same time (e.g., time-aligned images) from a system process, and the system process may, responsively, provide images having the same frame identifier (e.g., sets of images with the frame identifier M+2, sets of images with the frame identifier M+8, etc. in the example of FIG. 3) to the requesting subsequent process.

In this way, the subsequent processes at the electronic device can be provided with frame identifiers that identify which images from the first camera are synchronized (in time) with which images from the second camera. This can be beneficial (e.g., relative to providing time stamps of the images to the subsequent processes, from which the subsequent processes can individually attempt to synchronize or correlate image from multiple cameras). For example, the subsequent processes may utilize fewer resources (e.g., power, memory, and/or processing resources) that would otherwise be used by the various subsequent processes to compute the image correlations individually from the time stamps. As another example, variations in time stamping (e.g., a time stamp at the beginning of image exposure, a time stamp at the middle of image exposure, a time stamp at the end of image exposure, or a time stamp at the readout time) of image frames, and/or variations in individual time-stamp-based image correlation algorithms can lead to attempts to synchronize of images from one camera with the wrong image(s) from another camera when image time stamps are used by individual processes for image synchronization. Such incorrect attempts to synchronize images can lead to jitter, latency, and/or other artifacts and/or image processing issues that can be mitigated or eliminated by assigning synchronized frame identifiers to each image from each camera, as described herein.

In one or more implementations, the frame identifiers can be provided in metadata for an output image or image frame. In an electronic device in which multiple processes are operating based on images from one or more cameras, assigning synchronized frame identifiers to each image from each camera, as described herein, can allow the multiple processes to run off of the same frame, thereby achieving synchronization across the system of various processes. In one or more implementations, one process that operates on an image with a frame identifier may provide a result or output of that process to a subsequent process along with the frame identifier of that image (e.g., so that the subsequent process can utilize the result or output along with one or more images having the same frame identifier for subsequent processing). It is appreciated that the result or output of a process, that is provided to a subsequent process along with a frame identifier, can include image data (e.g., a processed image) and/or any other type of result or output (e.g., a list of points in one or more images having the frame identifier, extracted metadata from one or more images having the frame identifier, one or more identifiers of one or more objects detected by the process in one or more images having the frame identifier, one or more identifiers of one or more actions detected by the process in one or more images having the frame identifier, etc.) that is related to the image or images having the frame identifier.

In the example of FIG. 3, the exposure time 302 and the readout time 304 of the first (camera corresponding to the timeline 303), are substantially the same for every image capture. In the example of FIG. 3, the exposure time 306 and the readout time 308 of the second camera (corresponding to the timeline 305), are substantially the same for every image capture. However, this is merely illustrative. In one or more other use cases, the exposure time 302 and/or the exposure time 306 may be variable exposure times, which can vary according to, for example, a predetermined set of exposure times, varying ambient light conditions and/or operational modes of the electronic device. Whether the exposure time is fixed (e.g., as in the example of FIG. 3) or variable, and/or whether the image capture cadence is fixed (e.g., as in the example of FIG. 3) or variable, the exposure time and the readout time (e.g., and a delay time between a trigger time and an exposure initiation time) for a given camera may be known a priori (e.g., prior to beginning image capture operations with that camera), and can be stored at the electronic device (e.g., in the memory 206). In one or more implementations, an exposure time and/or a readout time (e.g., and a delay time between a trigger time and an exposure initiation time) may be stored for one or several operational modes of a camera (e.g., one or several frame rates (e.g., frame capture cadences), and/or one or several exposure times, of the camera). In one or more implementations, the exposure time(s) and readout time(s) (e.g., and a delay time between a trigger time and an exposure initiation time) can be stored individually, or can be combined (e.g., summed) to determine an offset time between the initiation of the capture of an image (e.g., at the time of and responsive to a system pulse 300) and the output time of that image.

Challenges can arise when attempting to determine which of the values 307 of the system pulses 300 should be used as a frame identifier for a particular image. For example, due to device, system, and/or camera operations, the output of an image frame from an image sensor may be delayed and/or differently positioned in time with respect to the system pulses. In this example, if the value 307 were to be determined based on a delayed output time (e.g., a delayed output time 312 or a delayed output time 316), the delayed output time could cause the wrong value 307 (e.g., the wrong frame identifier) to be associated with the image frame. As another example, an output time for the image frame from the first camera may be at a time corresponding to a value of M+4.5 and an output time for the image frame from the second camera may be at a time corresponding to a value of M+4.9, which could cause the second frame to be provided with a frame identifier of M+5 and the first frame to be provided with a frame identifier of M+4 or M+5, particularly, for example, if different frame identification operations (e.g., based on image time stamps instead of frame identifiers) were used by various different processes at a device. In a case in which the first image and the second image are intended to be synchronized for processing (e.g., a case in which the exposure times of the first image and the second image overlap and/or the mid-exposure times for the first and second image are substantially aligned in time), applying the frame identifier M+4 to the first frame and the frame identifier M+5 to the second frame can cause unwanted artifacts and/or disruptions to subsequent processes (e.g., processes that co-process image frames exposed and/or captured during overlapping exposure times).

In order, for example, to mitigate or eliminate these issues that can arise when determining a frame identifier based on an output time for an image frame, in one or more implementations, a frame identifier for each of multiple image frames from each of multiple cameras may be determined by a system process of a device using the values 307 of the system pulses 300. For example, the system process may determine the frame identifier for an image from an image sensor as the value 307 of the system pulse 300 that triggered the capture of that image. As another example, the system process may determine the frame identifier for an image from an image sensor as the value 307 of the system pulse 300 that is nearest to the mid-exposure time for that image. As another example, the system process may determine the frame identifier for an image from an image sensor by incrementing the value 307 of the system pulse 300 used for a previous image from the same image sensor by a predetermined identifier offset (e.g., an integer offset) for that image sensor. As another example, the frame identifier for an image may be determined by adding an offset time to a time of the system pulse 300 that triggered initiation of the capture of that image frame in some implementations. For example, the offset time may be a sum of the exposure time for that camera, the readout time for that camera, and/or a delay time between the time of the system pulse 300 that triggered the image capture by that camera and an initiation time of the exposure by that camera. The value 307 of the system pulse 300 having a time that is nearest to the time resulting from the addition of the offset time to the time of the system pulse that triggered the initiation of the capture of the image may be set as the frame identifier for that image in one or more implementations.

Figure 4:
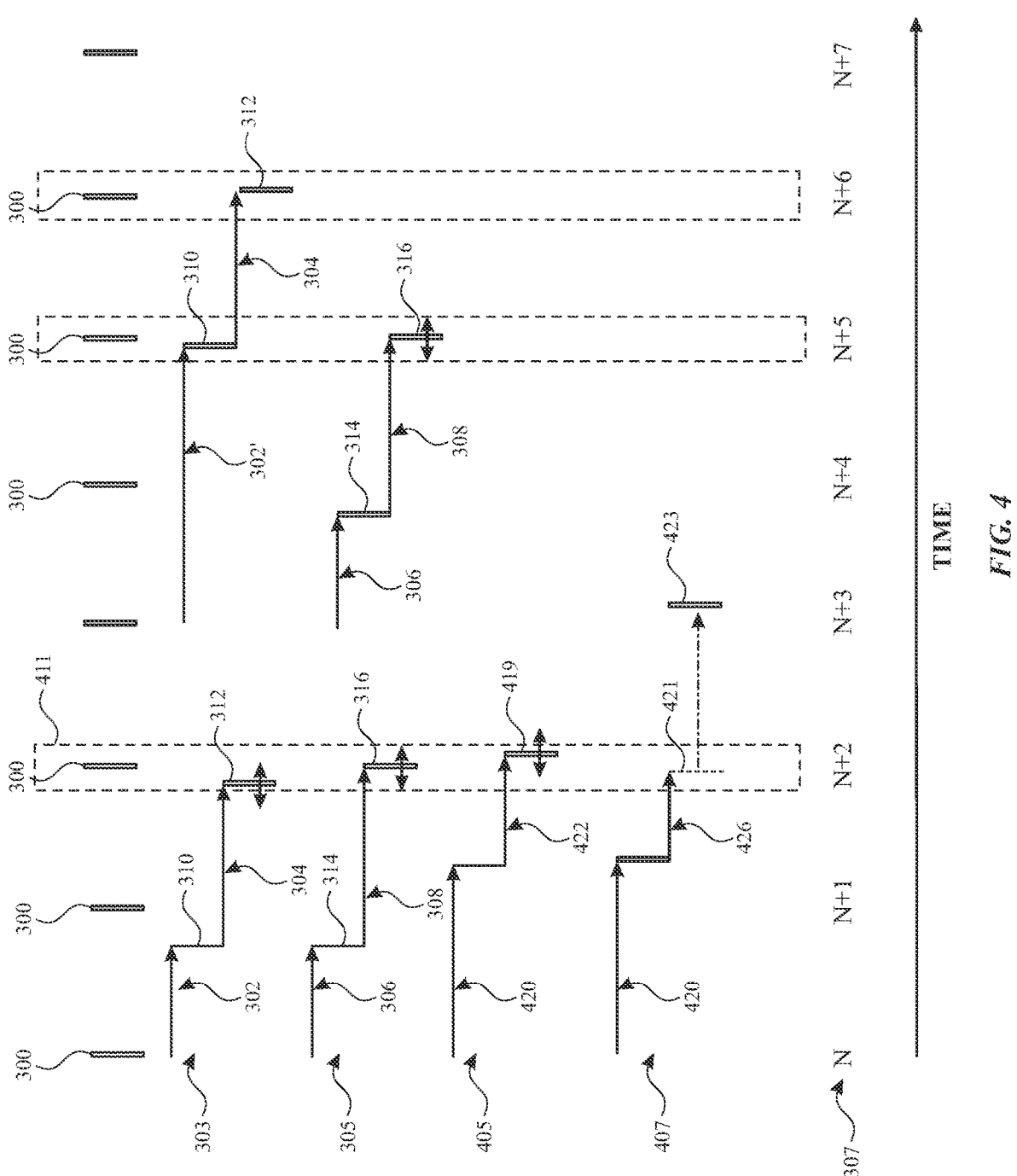
FIG. 4 illustrates a schematic timing diagram illustrating additional aspects of system pulses and various offsets for various cameras in accordance with one or more implementations.

FIG. 4 illustrates examples of use cases in which determining the frame identifier for each image frame in this way can be beneficial. For example, in the timeline 303 of a first camera (e.g., a first camera 150 of the electronic device 105 having a first image sensor 215), a first exposure time 302 and a first readout time 304 results in an output time 312 of a first image from the first camera that is nearest in time to the system pulse 300 corresponding to the value N+2. In this example, the first camera is a variable frame rate camera, and an exposure time 302' for second image from the first camera is longer than the exposure time 302 of the first image from the first camera. Determining the frame identifiers for the images from the first camera using the system pulses 300 (e.g., using the triggering system pulse, or using an offset time determined using the variable exposure time and the readout time for that first camera), can allow the frame identifier determination to account for the variable exposure times of the first camera.

In the example of FIG. 3, image capture and frame identification by two cameras is shown, but this is merely illustrative and image capture and frame identification may be performed for a single camera, or more than two cameras in other examples, such as in the example of FIG. 4.

FIG. 4 also shows how the actual output time 312 of the first image from the first camera may vary in a way that can place the output time 312 into or outside of a range 411 of the system pulse 300 having the value N+2. By setting the frame identifier for the first image based on the system pulses 300 as described herein, variations in the actual output time 312 can be prevented from affecting the frame identifier, and thereby prevented from negatively affecting the synchronization with, for example, the first image from the second camera (e.g., a second camera 150 of the electronic device 105 having a second image sensor 215) corresponding to the timeline 305, and also having a frame identifier N+2.

FIG. 4 also illustrates how the output time 312 of the first image from the first camera may be near the beginning of the range 411 of the system pulse 300 having the value N+2, and an output time 419 of a first image from a third camera (e.g., a third camera 150 of the electronic device 105 having a third image sensor 215) corresponding to a timeline 405 may be at or near the end of the range 411 of the system pulse 300 having the value N+2. In this example, although the first image from the first camera and the first image from the third camera should be synchronized for subsequent processes by having the same frame identifier (e.g., N+2), variations of the output times 312 and/or 419 with respect to the edges of the range 411 could cause different frame identifiers to be applied to these images if the actual output times 312 and 419 were to be used to determine the frame identifiers.

By setting the frame identifier for the first image from the first camera based on the time of the system pulse 300 that triggered initiation of the capture of the first image (e.g., and based on a known offset time, such as the sum of the exposure time 302 and the readout time 304 in some implementations) for that camera, and by setting the frame identifier for the first image from the third camera based on the time of the system pulse 300 that triggered initiation of the capture of the first image from the third camera (e.g., and based on the known offset time, such as the sum of the exposure time 420 and the readout time 422 in some implementations) for that camera, variations in the actual output time 312 and/or the actual output time 419 can be prevented from affecting the frame identifiers, and thereby prevented from negatively affecting the synchronization of these two images (e.g., and/or synchronization of these two images with, for example, the first image from the second camera corresponding to the timeline 305, and also having the frame identifier N+2).

FIG. 4 also illustrates an example timeline 407 in which an output time 423 of an image from a fourth camera (e.g., a fourth camera 150 of the electronic device 105 having a fourth image sensor 215) has been unintentionally delayed (e.g., due to a processing delay or other temporary system, device, camera, and/or image sensor issue or delay) from an expected output time 421. This example highlights another potential benefit of determining the frame identifier using the time of the system pulse 300 that triggered the initiation of the capture of the image (e.g., and the offset time corresponding to the exposure time 424 and the readout time 426 in some examples), rather, for example, than determining the frame identifier using the actual output time 423 of the image. For example, if the output time 423 of the image captured by the fourth camera were used to determine the frame identifier for that image, the frame identifier would correspond to a value of N+3, and any subsequent processes relying on that frame identifier would fail to correctly synchronize the image from the fourth camera with the image from the first camera output at the output time 312 (and having the frame identifier N+2), the image from the second camera output at the output time 316 (and having the frame identifier N+2), and the image (having the frame identifier N+2) from the third camera output at the output time 419 (e.g., for which the exposure times 302, 306, 420, and 424 overlap and which are therefore correlated with each other in time). Instead, determining the frame identifier as N+2 using the system pulses 300 (e.g., by determining the time of the system pulse 300 that triggered the capture of the image, obtaining the offset time corresponding to the sum of the exposure time 424 and the readout time 426, adding the offset time to the time of the system pulse 300 that triggered the capture of the image to obtain the expected output time 421, and identifying the value 307 (e.g., a value of N+2) of the system pulse 300 having the time that is nearest to the expected output time 421 in some examples), the image from the fourth camera for which the capture was triggered by the system pulse 300 corresponding to the value N can be correctly correlated and/or synchronized with the other images with the same frame identifier N+2.

As discussed herein, in one or more implementations, the frame identifiers for images from multiple cameras can be determined using an offset from a system pulse. FIG. 5 illustrates an example process 500 for providing image synchronization for multiple cameras using a system pulse and an offset time, in accordance with one or more implementations. For explanatory purposes, the process 500 is primarily described herein with reference to the electronic device 105 of FIGS. 1 and 2. However, the process 500 is not limited to the electronic device 105 of FIGS. 1 and 2, and one or more blocks (or operations) of the process 500 may be performed by one or more other components of other suitable devices, including the electronic device 110, the electronic device 115, and/or the servers 120. Further for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

In the example of FIG. 5, at block 502, a capture of a first image by a first image sensor (e.g., a first image sensor 215 of a first camera 150) may be initiated using a first system pulse (e.g., a first system pulse 300, such as a system pulse from an oscillator 217). For example, the first system pulse 300 may be provided from the oscillator 217 to the first camera 150, and the first camera 150 may begin a first exposure time with the first image sensor 215 for the first image responsive to receiving the first system pulse.

At block 504, a capture of a second image by a second image sensor (e.g., a second image sensor 215 of a second camera 150) may be initiated using the first system pulse. For example, the first system pulse 300 may also be provided from the oscillator 217 to the second camera 150, and the second camera 150 may begin a second exposure time with the second image sensor 215 for the second image responsive to receiving the first system pulse.

At block 506, a first offset time may be obtained for the first image sensor. For example, obtaining the first offset time may include determining the first offset time based on a predetermined exposure time (e.g., exposure time 302) and a predetermined readout time (e.g., readout time 304) for the first image sensor. For example, determining the first offset time based on the predetermined exposure time and the predetermined readout time for the first image sensor may include determining a sum of the predetermined exposure time and the predetermined readout time for the first image sensor. In one or more implementations, the first offset time may also, or alternatively, include a delay time between the time of the first system pulse and an initiation time for the capture of the first image by the first image sensor. In one or more implementations, obtaining the first offset time may include obtaining the first offset time from memory of an electronic device having the first camera and/or the second camera. For example, the first offset time may have been previously stored in the memory, prior to the first system pulse 300.

At block 508, a second offset time may be obtained for the second image sensor. For example, obtaining the second offset time may include determining the second offset time based on a predetermined exposure time (e.g., exposure time 306) and a predetermined readout time (e.g., readout time 308) for the second image sensor. For example, determining the second offset time based on the predetermined exposure time and the predetermined readout time for the second image sensor may include determining a sum of the predetermined exposure time and the predetermined readout time for the second image sensor. In one or more implementations, the second offset time may also, or alternatively, include a delay time between the time of the first system pulse and an initiation time for the capture of the second image by the second image sensor. In one or more implementations, obtaining the second offset time may include obtaining the second offset time from memory of the electronic device having the first camera and/or the second camera. For example, the second offset time may have been previously stored in the memory, prior to the first system pulse 300.

In one or more implementations, the first offset time and the second offset time (e.g., and/or a delay time) may be stored (e.g., in memory 206) prior to initiating the capture of the first image at block 502 and initiation the capture of the second image at block 504. For example, an electronic device such as electronic device 105 may store offset times for each of multiple cameras, such as cameras 150 (e.g., for each of multiple image sensors, such as image sensors 215) of the electronic device. In one or more implementations in which one or more cameras of an electronic device are variable frame rate (or variable exposure time) cameras, the electronic device may store multiple offset times for a single camera (or image sensor). For example, multiple offset times for multiple operational modes (e.g., multiple discrete frame rates or multiple discrete exposure times) for a camera or an image sensor may be pre-stored at an electronic device.

At block 510, a first frame identifier may be determined for the first image based on the first offset time and a time of the first system pulse. For example, determining the first frame identifier may include identifying a frame identifier (e.g., a value 307) that is associated with a second system pulse (e.g., a second system pulse 300) that is subsequent to the first system pulse by an amount of time corresponding to the first offset time. For example, the electronic device having the first image sensor and the second image sensor may determine a time of the first system pulse 300 that initiated the capture of the first image, add the first offset time to the time of the first system pulse 300, identify the second system pulse has having a time that is nearest to the result of adding the first offset time to the time of the first system pulse, and setting the first frame identifier to a value of the second system pulse. In one or more other implementations, the first frame identifier may be determined by identifying the first system pulse 300 that initiated (e.g., triggered) the capture of the first image (e.g., without applying an offset).

At block 512, a second frame identifier may be determined for the second image based the second offset time and the time of the first system pulse. For example, determining the second frame identifier may include identifying the frame identifier that is associated with the second system pulse that is subsequent to the first system pulse by an amount of time corresponding to the second offset time (e.g., the first frame identifier of the first image may be the same as the second frame identifier of the second image). In another example, determining the second frame identifier may include identifying a frame identifier that is associated with a third system pulse that is subsequent to the first system pulse by an amount of time corresponding to the second offset time, the third system pulse being different from the second system pulse (e.g., the second frame identifier may be different from the first frame identifier). For example, the electronic device having the first image sensor and the second image sensor may determine a time of the first system pulse 300 that initiated the capture of the first image, add the second offset time to the time of the first system pulse 300, identify the second system pulse or the third system pulse has having a time that is nearest to the result of adding the first offset time to the time of the first system pulse, and set the second frame identifier to a value of the second system pulse or the third system pulse identified as nearest to the result of adding the first offset time to the time of the first system pulse. In one or more other implementations, the second frame identifier may be determined by identifying the first system pulse 300 that initiated (e.g., triggered) the capture of the second image (e.g., without applying an offset).

At block 514, the first image with the first frame identifier and the second image with the second frame identifier may be provided to a process (e.g., an application process or a system process) of an electronic device (e.g., the electronic device 105) for determining an input to the electronic device or an output of the electronic device. In one or more implementations, the first image with the first frame identifier and the second image with the second frame identifier may be provided to the process by a system process at the electronic device, responsive to a request from the process. In one or more implementations, determining the input to the electronic device may include detecting a feature of a physical environment of the electronic device using the first image and the second image synchronized using the first frame identifier and the second frame identifier. For example, detecting the feature of the physical environment may include detecting a hand of a user, a gesture of a user, an eye of a user, a gaze of a user, an object in the physical environment, and/or mapping a portion of the environment that is (e.g., at least partially) concurrently present is both the first image and the second image, and using the first frame identifier and the second frame identifier to determine that the first image and the second image were captured using at least partially overlapping exposure times. In one or more implementations, determining the input may include tracking a hand, a gesture, an eye, a gaze, an object, or the like across sequences of images frames from multiple cameras, the sequences of image frames identified by sequences of respective frame identifiers.

As an example, determining the output of the electronic device may include generating display content for display by a display (e.g., display 200) of the electronic device using the first image and the second image synchronized using the first frame identifier and the second frame identifier. For example, generating the display content may include generating virtual content to be displayed by the display of the electronic device to appear as though at a location, separate from the display and/or the electronic device, in the physical environment, the location determined using both the first image and the second image, and using the first frame identifier and the second frame identifier to determine that the first image and the second image were captured using at least partially overlapping exposure times. In one or more implementations, determining the output may include combining sequences of images frames from multiple cameras, the sequences of image frames identified by sequences of respective frame identifiers, to form sequences of display frames for display by the display 200 of the electronic device 105.

In one or more implementations, the process 500 may also include initiating a capture of a third image by the first image sensor using a second system pulse (e.g., second system pulse 300); obtaining a third offset time, different from the first offset time, for the first image sensor; and determining a third frame identifier for the third image based the third offset time and a time of the second system pulse (e.g., by adding the third offset time to the time of the second system pulse). For example, the third offset time for the first camera may be different from the first offset time for the first camera due to a change in an exposure time for capturing the third image with the first camera (e.g., relative to the exposure time for capturing the first image with the first camera). In the example of FIG. 5, frame identifiers are determined for first and second frames from first and second image sensors. In other examples, any number of image frames from any number of image sensors may be determined using the process 500. In one or more implementations, the process 500 may be repeated (e.g., on a continuous basis) for all images generated by the first image sensor, the second image sensor, and/or one or more additional image sensors.

As discussed herein, whether the frame identifiers are determined using an offset time as in the example of FIG. 5, or based on the system pulse that triggered image capture without applying an offset, determining frame identifiers for images from multiple cameras using labels (e.g., values 307) of system pulses (e.g., by selecting frame identifiers from a set of discrete values 307 rather than substantially continuous image output times) can allow subsequent processes to immediately identify images from multiple cameras that are time-aligned, or synchronized in time, with each other. These frame identifiers can also be used to allow subsequent processes to immediately identify other data (e.g., data derived from one or more images having a frame identifier), such as the output or result of an intermediate process that consumes images, that is time-aligned with, synchronized in time with, and/or otherwise associated with the one or more images having that frame identifier. This can be helpful in, for example, cases in which images from multiple cameras are used to generate a real-time input or output for a device. For example, time-aligned images from multiple cameras may be used by various processes in a processing chain for object tracking, hand tracking, eye or gaze tracking, scene mapping, or the like. For example, frame identifiers based on system pulses as described herein can be helpful when a processing pipeline includes multiple processes that use the same time-aligned images and/or outputs of other processes that consume the time-aligned images. As examples, FIGS. 6 and 7 illustrate processing pipelines that can benefit from images and/or related data being provided with synchronized frame identifiers as described herein.

Figure 6:
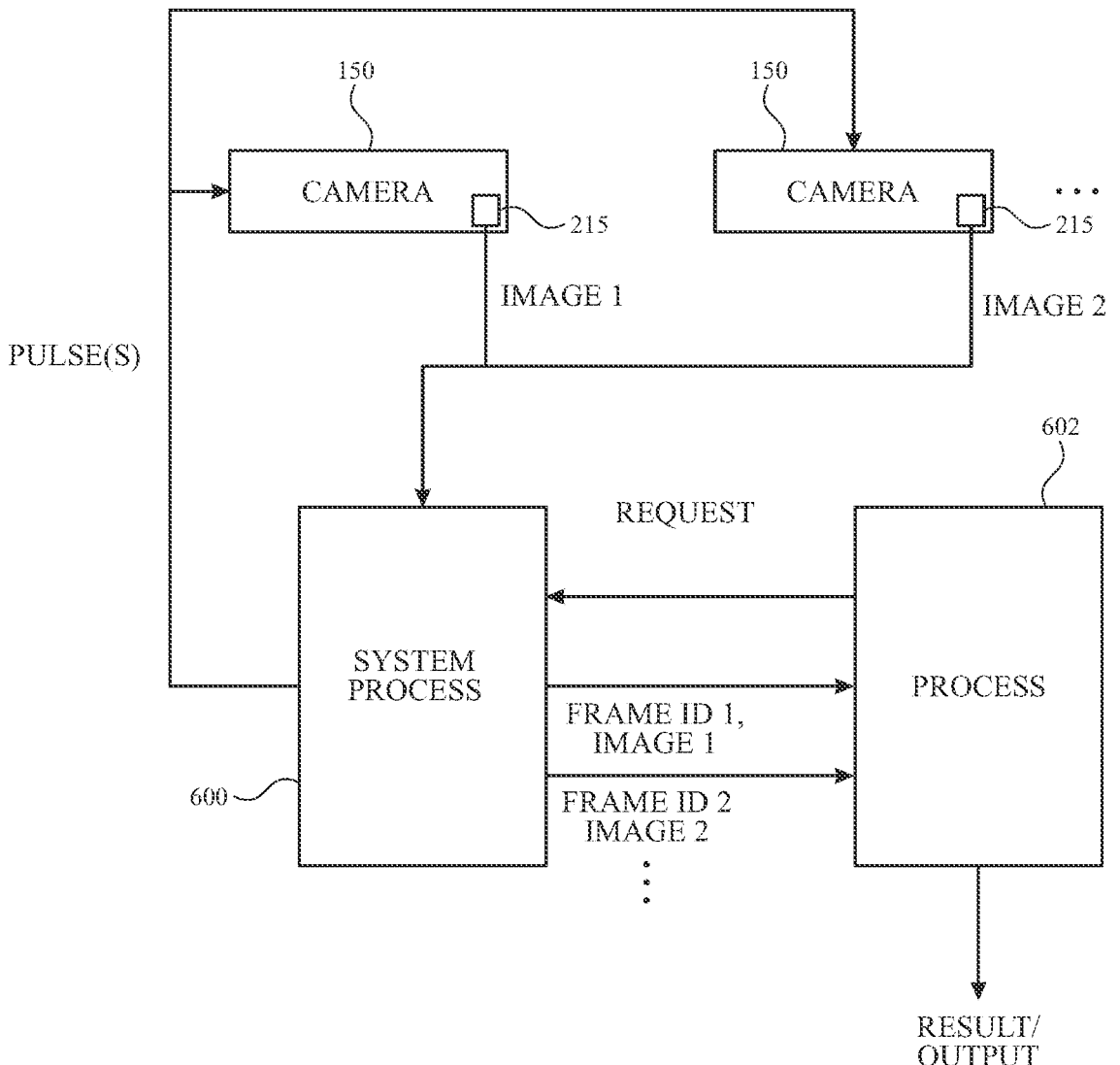
FIG. 6 illustrates an example flow diagram for operating a device based on images from multiple cameras having synchronized frame identifiers in accordance with one or more implementations.
Figure 7:
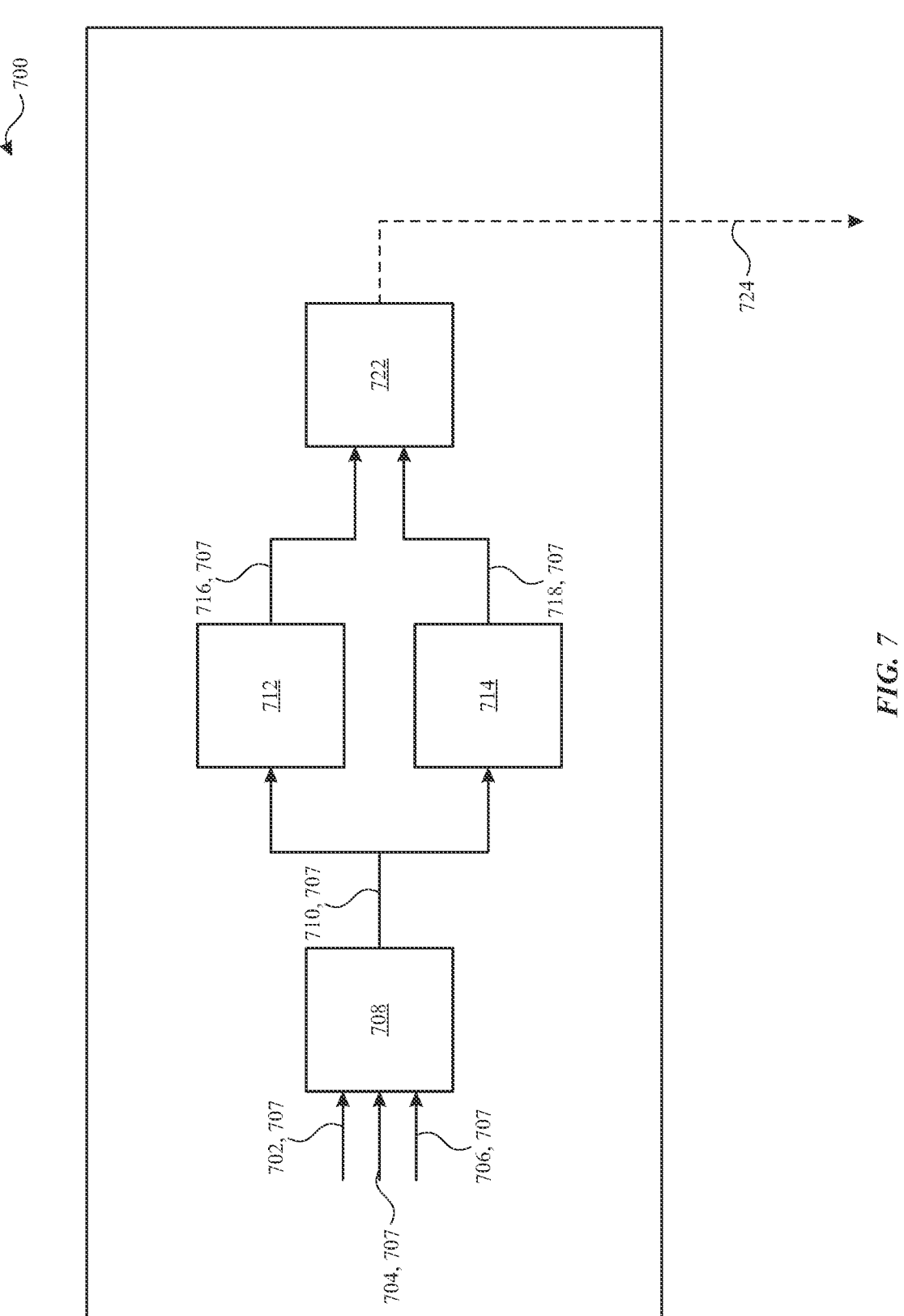
FIG. 7 illustrates an example processing pipeline in accordance with one or more implementations.

For example, FIG. 6 illustrates an example flow diagram illustrating a various operations that may be performed for operating an electronic device based on time-aligned images having frame identifiers that are based on system pulses. As shown in FIG. 6, a first camera (e.g., one of cameras 150) having a first image sensor (e.g., a first one of image sensors 215) may capture a first image (e.g., IMAGE 1) and a second camera (e.g., another of cameras 150) having a second image sensor (e.g., a second one of image sensors 215) may capture a second image (e.g., IMAGE 2). In the example of FIG. 6, two cameras/image sensors capture two images, however this is merely illustrative and any number of cameras/image sensors can capture any number of images.

As shown, each of the cameras 150 may receive one or more system pulses (e.g., system pulses 300 of FIG. 3 or 4). The system pulses may trigger the cameras 150 to capture the respective images. In the example of FIG. 6, the system pulses are received by the cameras 150 from a system process 600 (e.g., from a hardware component such as the oscillator 217 of FIG. 2 via the system process 600). In one or more other implementations, the system pulses may be received by the cameras 150 directly from a hardware component (e.g., an oscillator 217) of the device at which the cameras 150 are implemented (e.g., electronic device 105). As discussed herein, the system pulses may trigger an immediate image capture by a camera 150, or an image capture following a predetermined delay time after the system pulse in various implementations.

In one or more implementations, the system process 600 may determine a first frame identifier (FRAME ID 1) for the first image based at least in part on the system pulse that triggered the capture of the first image (as described herein), and may determine a second frame identifier (FRAME ID 2) for the second image based at least in part on the system pulse that triggered the capture of the second image (as described herein). In some examples, the first frame identifier and the second frame identifier may be the same.

As illustrated in FIG. 6, in one or more implementations, one or more processes at the electronic device 105, such as a process 602, may request, from the system process 600, time-aligned images from multiple cameras 150. Responsively, the system process 600 may obtain the first image and the second image having the same frame identifier, and provide the first image and the second image and their respective frame identifiers (which may be the same frame identifier) to the process 602. As shown, the process 602 may generate a result or output based on processing of the first image and the second image having the same frame identifier (e.g., in the example in which FRAME ID 1 is the same as FRAME ID 2). In one or more implementations, the result/output of the process 602 may be an identified input to the device (e.g., a hand gesture, a gaze location, or other user input) or an identified output (e.g., a video output, an audio output, a haptic output) of the device based on the first and second images having the same frame identifier.

As discussed in further detail hereinafter, in one or more other implementations, the result/output of the process 602 (e.g., and/or the first image, the second image, the first frame identifier, and the second frame identifier) may be provided to one or more additional processes (e.g., another system process or application process at the electronic device or another electronic device), prior to determining an input or an output of the electronic device.

For example, FIG. 7 illustrates one example of a processing pipeline that may benefit from images from multiple cameras in which frame identifiers for the images are generated in a coordinated and/or synchronized manner by the system process 600 (e.g., based at least in part on the system pulses that triggered capture of the images). In the example of FIG. 7, the processing pipeline 700 includes a first process 708 (e.g., an implementation of the process 602 of FIG. 6) that receives (e.g., from the system process 600 of FIG. 6, such as in response to a request to the system process 600) a first image 702 (e.g., from a first one of image sensors 215 of a first one of cameras 150), a second image 704 (e.g., from a second one of image sensors 215 of a second one of cameras 150), and/or a third image 706 (e.g., from a third one of image sensors 215 of a third one of cameras 150). In some examples, a fourth image, a fifth image, and/or other additional images from respective fourth, fifth, and/or other image sensors (e.g., of fourth, fifth, and/or other cameras) may be received by the first process 708.

In various implementations, the first process 708 may be an additional system process of the electronic device 105 or may be an application process running at the electronic device 105. The first process 708 may also receive (e.g., from the system process 600, such as in metadata of each of the first image 702, the second image 704, and/or the third image 706) frame identifiers including a first frame identifier for the first image 702, a second frame identifier for the second image 704, and/or a third frame identifier for the third image 706. For example, the first frame identifier, the second frame identifier, and the third frame identifier may be the same frame identifier (e.g., a frame identifier 707), thus identifying the first image 702, the second image 704, and the third image 706 as being time-aligned images from the respective first, second, and third image sensors.

In the example of FIG. 7, a result 710 or output of the first process 708 may be provided, along with or including the frame identifier 707 that is common to the first image 702, the second image 704, and/or the third image 706, to a first additional process 712 and a second additional process 714. In this way, the result 710 may be identified to the first additional process 712 and the second additional process 714 as corresponding to the first image 702, the second image 704, and/or the third image 706. In the example of FIG. 7, the first additional process 712 and the second additional process 714 each process the result 710 in parallel with each other, and each provide a respective result or output (e.g., the result 716 and the result 718, respectively) to a third additional process 722. In this example, the third additional process 722 processes the result 716 from the first additional process 712 and the result 718 from the second additional process 714 to generate an output 724. For example, the output 724 may be an identified input to the electronic device 105 or an identified output to be provided from the electronic device 105 (e.g., by a display, a speaker, a haptic component, or other output component of the electronic device 105).

In one or more implementations, the first additional process 712 may have a processing time for processing the result 710 that is different from (e.g., longer than) a processing time for the second additional process 714 to process the result 710. Accordingly, the result 716 and the result 718 may be received by the third additional process 722 at different times or asynchronously. In one or more implementations, the first additional process 712 and the second additional process 714 may provide, to the third additional process 722 (e.g., in metadata of the result 716 and the result 718) along with the respective result 716 and result 718, the frame identifier 707 that is common to the first image 702, the second image 704, and/or the third image 706. In this way, the third additional process 722 may be provided with the ability to determine that the result 716 and the result 718, having a common frame identifier of the first image 702, the second image 704, and/or the third image 706, are to be processed together. In one non-limiting example, the first additional process 712 may be a gesture detector (e.g., a machine learning model or rules-based process for gesture detection in images), the second additional process 714 may be a hand tracker (e.g., a machine learning model or rules-based process for tracking the location of a user's hand in images), and the third additional process 722 may be a user-interface interaction detector (e.g., a machine learning model or rules-based process for detecting an intentional user interaction with a user interface element based on both a location of the user's hand and a detected gesture). In this non-limiting example, the output 724 may be an identified user input to a particular user interface element.

Figure 8:
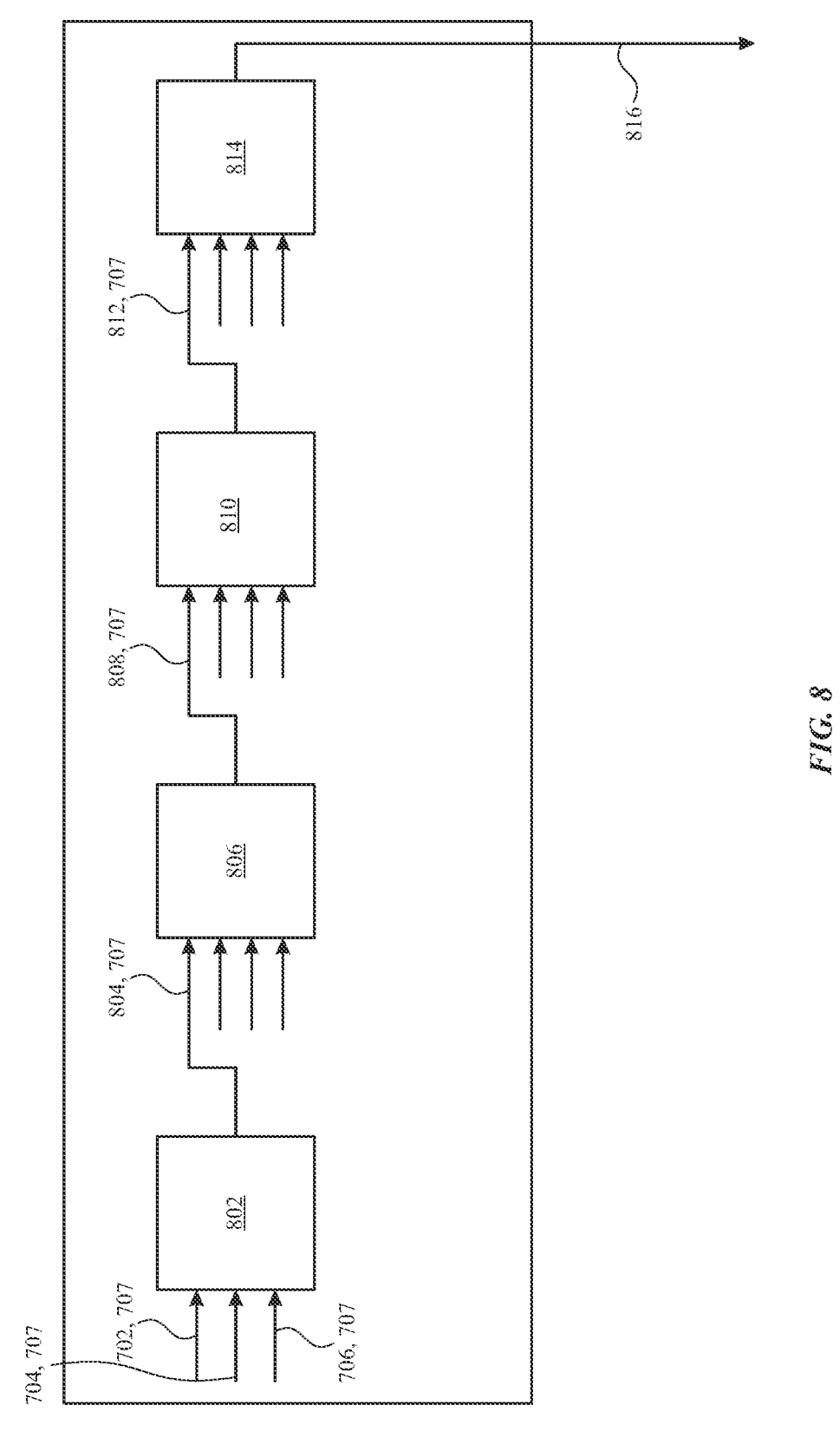
FIG. 8 illustrates another example processing pipeline in accordance with one or more implementations.

FIG. 8 illustrates another example of a processing pipeline that may benefit from images from multiple cameras in which frame identifiers for the images are generated in a coordinated and/or synchronized manner by the system process 600 (e.g., based at least in part on the system pulses that triggered capture of the images). In the example of FIG. 8, the processing pipeline 800 includes a first process 802 (e.g., an implementation of the process 602 of FIG. 6) that receives (e.g., from the system process 600 of FIG. 6, such as in response to a request to the system process 600) the first image 702 (e.g., from the first one of image sensors 215 of a first one of cameras 150), the second image 704 (e.g., from the second one of image sensors 215 of a second one of cameras 150), and/or the third image 706 (e.g., from the third one of image sensors 215 of a third one of cameras 150). In some examples, a fourth image, a fifth image, and/or other additional images from respective fourth, fifth, and/or other image sensors (e.g., of respective fourth, fifth, and/or other cameras) may be received by the first process 802.

In various implementations, the first process 802 may be an additional system process of the electronic device 105 or may be an application process running at the electronic device 105. The first process 802 may also receive (e.g., from the system process 600, such as in metadata of each of the first image 702, the second image 704, and/or the third image 706) frame identifiers including a first frame identifier for the first image 702, a second frame identifier for the second image 704, and/or a third frame identifier for the third image 706. For example, the first frame identifier, the second frame identifier, and the third frame identifier may be the same frame identifier 707, thus identifying the first image 702, the second image 704, and the third image 706 as being time-aligned images from the respective first, second, and third image sensors.

In the example of FIG. 8, a result 804 or output of the first process 802 may be provided, along with the frame identifier 707 that is common to the first image 702, the second image 704, and/or the third image 706, to a process 806. In the example of FIG. 8, the first image 702, the second image 704, and/or the third image 706 are also provided to the process 806. In this way, the frame identifier 707 that is common to the first image 702, the second image 704, and/or the third image 706 can indicate to the process 806 that the result 804, the first image 702, the second image 704, and/or the third image 706 are to be processed together. In one non-limiting example, the first process 802 may be an object detector and the result 804 may include an indication that an object has been detected in the first image 702, the second image 704, and/or the third image 706. In this non-limiting example, the process 806 may be a process for detecting one or more attributes of the detected object, and may perform attribute detection and/or tracking using the first image 702, the second image 704, and/or the third image 706 responsive to receiving the indication from the first process 802.

In the example of FIG. 8, the processing pipeline 800 also includes a process 810 that receives a result 808 of the process 806 along with the frame identifier 707 and the first image 702, the second image 704, and/or the third image 706. In this example, the processing pipeline 800 also includes a process 814 that receives a result 812 of the process 810 along with the frame identifier 707 and the first image 702, the second image 704, and/or the third image 706. In this example, the process 814 generates an output 816. For example, the output 816 may be an identified user input to the electronic device 105 or an identified output to be provided by a display, a speaker, a haptic component, or another output component of the electronic device 105.

In the example of FIG. 8, the processing pipeline 800 includes three processes that each receive multiple time-aligned images from multiple cameras and each receive a result of a prior processing block that processed the same multiple time-aligned images. However, this is merely illustrative, and other processing pipelines may include more than three or fewer than three processes that each receive multiple time-aligned images from multiple cameras and receive a result of a prior processing block that processed the same multiple time-aligned images. In the example of FIG. 8, the process 806, the process 810, and the process 814 are shown as being performed in series. However, it is also appreciated that, in other implementations, one or more of the processes 806, 810, 814, and/or other processes may be performed partially or entirely in parallel with one or more others of the processes 806, 810, 814, and/or other processes. In the examples of FIGS. 7 and 8, the image 702, the image 704, and the image 706 may be raw or unprocessed image frames from the image sensors 215 of various cameras 150, and/or may have been pre-processed by one or more pre-processing operations (e.g., flattening, smoothing, background subtraction, and/or other image pre-processing operations). In either case, the frame identifier for each image may be assigned to that image at or near the time of readout of the raw image frame, and propagated with the image through any number of pre-processing or processing operations as described herein. In the examples of FIGS. 7 and 8, images having frame identifiers are described. However, this is merely illustrative and, in other implementations and/or use cases, other data having frame identifiers may be provided to one or more of the processes of FIGS. 7 and/or 8. For example, sensor data from a sensor other than a camera may be provided with a frame identifier (e.g., based on a system pulse) that identifies that sensor data with one or more images having the same frame identifier, one or more outputs of one or more respective processes having the same frame identifier, additional sensor data from another sensor and having the same frame identifier, and/or any other data having the same identifier.

In the examples of FIGS. 7 and 8, the processing pipeline 700 and/or the processing pipeline 800 may be performed entirely at one electronic device (e.g., the electronic device 105), or one or more of the processes of the processing pipeline 700 and/or the processing pipeline 800 may be performed at another electronic device (e.g., a companion device communicatively connected to the electronic device, a host device communicatively connected to the electronic device, and/or a server communicatively connected to the electronic device).

FIG. 9 illustrates an example process 900 for operating a device based on sensor data from multiple sensors and having synchronized frame identifiers, in accordance with one or more implementations. For explanatory purposes, the process 900 is primarily described herein with reference to the electronic device 105 of FIGS. 1 and 2. However, the process 900 is not limited to the electronic device 105 of FIGS. 1 and 2, and one or more blocks (or operations) of the process 900 may be performed by one or more other components of other suitable devices, including the electronic device 110, the electronic device 115, and/or the servers 120. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

In the example of FIG. 9, at block 902, first sensor data may be obtained by a first sensor (e.g., a camera 150 or a sensor 152) of a device (e.g., electronic device 105). For example, a first image may be captured using a first image sensor of a device (e.g., electronic device 105). For example, the first sensor may be a first one of the image sensors 215 of a first one of the cameras 150 of the electronic device 105. For example, the first image sensor may have a first sensor architecture and/or may be implemented in a first camera having a first camera architecture, a first primary function, and/or a first field of view. The first sensor data may be captured responsive to a first system pulse (e.g., a first one of the system pulses 300) from a system component (e.g., an oscillator 217) of the device.

At block 904, second sensor data may be obtained using a second sensor (e.g., another camera 150 or another sensor 152) at the device. For example, a second image may be captured using a second image sensor of the device. For example, the second image sensor may be a second one of the image sensors 215 of a second one of the cameras 150 of the electronic device 105. For example, the second image sensor may have a second sensor architecture and/or may be implemented in a second camera having a second camera architecture, a second primary function, and/or a second field of view. Any or all of the second sensor architecture, the second camera architecture, the second primary function, and/or the second field of view may be different from the first sensor architecture, the first camera architecture, the first primary function, and/or the first field of view. In one or more implementations, additional sensor data, such as one or more additional images may be also obtained (e.g., captured) using one or more additional sensors (e.g., sensors 152 and/or cameras 150) of the device. The second sensor data may be captured responsive to a second system pulse (e.g., a second one of the system pulses 300) from a system component (e.g., an oscillator 217) of the device. The second system pulse may be the same as the first system pulse in some examples. In various implementations, additional sensor data (e.g., one or more additional images) may also be captured by one or more additional sensors (e.g., one or more additional cameras and/or image sensors).

At block 906, the device (e.g., a first system process of the device, such as the system process 600 of FIG. 6) may identify a frame identifier (e.g., frame identifier 707) that applies to both the first sensor data (e.g., the first image) and the second sensor data (e.g., the second image). For example, identifying the frame identifier that applies to both the first sensor data and the second sensor data (and/or additional sensor data such as one or more additional images) may include determining (e.g., by the system process 600) the frame identifier based on a system pulse (e.g., a system pulse 300) that triggered the first sensor (e.g., a first one of the image sensors 215 of a first one of the cameras 150) to obtain (e.g., capture) the first sensor data (e.g., the first image) and triggered the second sensor (e.g., a second one of the image sensors 215 of a second one of the cameras 150) to obtain (e.g., capture) the second sensor data (e.g., the second image). In one or more implementations, the system pulse may have also triggered one or more additional sensors to obtain additional sensor data, such as one or more additional respective images.

In one example, the frame identifier (e.g., the frame identifier 707) may be a value (e.g., a value 307) corresponding to the system pulse that triggered the first sensor to capture the first sensor data and that triggered the second sensor to capture the second sensor data. In another example, the frame identifier may be a value (e.g., a value 307) of a system pulse that occurred after the system pulse that triggered the first sensor to capture the first sensor data and that triggered the second sensor to capture the second sensor data (e.g., by an offset time). For example, in one or more implementations, the first sensor may include a first image sensor, the first sensor data may include a first image, the second sensor may include a second image sensor, the second sensor data may include a second image, and identifying the frame identifier that applies to both the first sensor data and the second sensor data may include obtaining a first offset time for the first image sensor; obtaining a second offset time for the second image sensor; determining a first frame identifier for the first image based on the first offset time and a time of a first system pulse that triggered the capturing of the first image; and determining a second frame identifier for the second image based on the second offset time and the time of the first system pulse. In this example, the first frame identifier may be the same as the second frame identifier. In one or more implementations, obtaining the first offset time may include determining the first offset time based on a predetermined exposure time and a predetermined readout time for the first image sensor, and obtaining the second offset time may include determining the second offset time based on a predetermined exposure time and a predetermined readout time for the second image sensor. In one or more other implementations, identifying the frame identifier that applies to both the first sensor data and the second sensor data may include identifying a value (e.g., a value 307) corresponding to a system pulse that occurred within a threshold amount of time of a mid-exposure time of both the first sensor data (e.g., the first image) and the second sensor data (e.g., the second image).

At block 908, the device (e.g., the first system process, such as the process 600) may receive (e.g., from a process at the device or another device, such as a second system process or an application process at the device, which may include, as examples, the process 602 of FIG. 6, the first process 708 of FIG. 7, or first process 802 of FIG. 8) a request for time-aligned data (e.g., time-aligned images from the first image sensor and the second image sensor). The request may be provided (e.g., by the second system process or the application process) at or near the time of capture of the first sensor data and the second sensor data, or may be a prestored request that has been previously provided (e.g., to the first system process) or stored for access by the first system process.

At block 910, the device (e.g., the first system process) may provide, based on the frame identifier that applies to both the first sensor data and the second sensor data and responsive to the request, the first sensor data and the second sensor data to a process at the device or another device (e.g., the second system process or the application process, which may include, as examples, the process 602 of FIG. 6, the first process 708 of FIG. 7, or first process 802 of FIG. 8). For example, the system process may obtain a first frame identifier of the first sensor data and a second frame identifier of the second sensor data, determine that the first frame identifier is the same as the second frame identifier (e.g., and that the first sensor data and the second sensor data are thus time-aligned), and provide the first sensor data and the second sensor data to the process responsive to determining that the first frame identifier is the same as the second frame identifier. In one or more implementations, providing the first sensor data and the second sensor data to the process may include providing the frame identifier to the process with each of the first sensor data and the second sensor data.

At block 912, the device may determine an input to the device or an output of the device based at least in part a result (e.g., the result 710 or the result 804) of the process performing a processing of the first sensor data and the second sensor data. In one or more implementations, the first system process may provide the frame identifier to at least one additional process (e.g., the process 712, the process 714, the process 722, the process 806, the process 810, or the process 814) at the device or the other device; and determine the input to the device or the output of the device based at least in part on the result of the process performing the processing of the first sensor data and the second sensor data and based on a result of the at least one additional process. In one or more implementations, determining the input to the device may include detecting a feature of a physical environment of the device (e.g., an object, a location, a hand, a gesture, a gaze location, or the like) based at least in part on the result of the process performing the processing of the first sensor data and the second sensor data. In one or more implementations, determining the output of the device may include generating display content for display by a display for the device (e.g., and/or audio content and/or video content) based at least in part on the result of the process performing the processing of the first sensor data and the second sensor data. As examples, generating display content for display by the display of the device based at least in part on the result of the process performing the processing of the first sensor data and the second sensor data may include modifying the display content based on a gesture detected by the process (or by a subsequent process using the frame identifier and an output of the process as an input), displaying an image generated by the process (or by a subsequent process using the frame identifier and an output of the process as an input), or otherwise generating display content based on one or more outputs of one or more processes (e.g., at the device and/or another device) that process the frame identifier, the first sensor data, the second sensor data, additional sensor data such as one or more additional images, and/or one or more other outputs of one or more other processes.

In one or more implementations, the process 900 may also include generating (e.g., by the second system process or the application process) the result of the process by processing the first sensor data and the second sensor data; providing the frame identifier (e.g., frame identifier 707) and the result of the process to a first additional process (e.g., the first additional process 712) at the device or another device and to a second additional process (e.g., the second additional process 714) at the device or the other device; and determining the input to the device or the output of the device based at least in part on a first additional result (e.g., the result 716) of the first additional process and a second additional result (e.g., the result 718) of the second additional process. For example, the process 900 may also include providing the frame identifier and the first additional result from the first additional process to a third additional process (e.g., the third additional process 722) at the device or the other device; providing the frame identifier and the second additional result from the second additional process to the third additional process; and determining, by the third additional process, the input to the device or the output of the device based at least in part on the first additional result of the first additional process the second additional result of the second additional process. For example, the output 724 of FIG. 7 may correspond to the input to the device or the output of the device in some examples.

In one or more implementations, the process 900 may also include generating the result (e.g., the result 804 of FIG. 8) of the process by processing the first sensor data and the second sensor data; providing the frame identifier and the result of the process to a first additional process (e.g., the process 806) at the device or another device; providing the frame identifier, the first sensor data, and the second sensor data to the first additional process; processing, by the first additional process, the first sensor data, the second sensor data, and the result of the process to generate a first additional result (e.g., the result 808); and determining the input to the device or the output of the device based at least in part on the first additional result of the first additional process. For example, the process 900 may also include providing the frame identifier and the result of the first additional process to a second additional process at the device or another device (e.g., the process 810 and/or the process 814); providing the frame identifier, the first sensor data, and the second sensor data to the second additional process; processing, by the second additional process, the first sensor data, the second sensor data, and the result of the first additional process to generate a second additional result (e.g., the result 812 or the output 816); and determining the input to the device or the output of the device based at least in part on the second additional result of the second additional process. In one or more implementations, determining the input to the device or the output of the device based at least in part on the second additional result of the second additional process may include determining the input to the device or the output of the device based at least in part on the second additional result of the second additional process and a third additional result (e.g., the result 812) of a third additional process (e.g., the process 810) at the device or another device (e.g., by determining the third additional result using the frame identifier, the second additional result and the first, second, and/or third sensor data).

Figure 10:
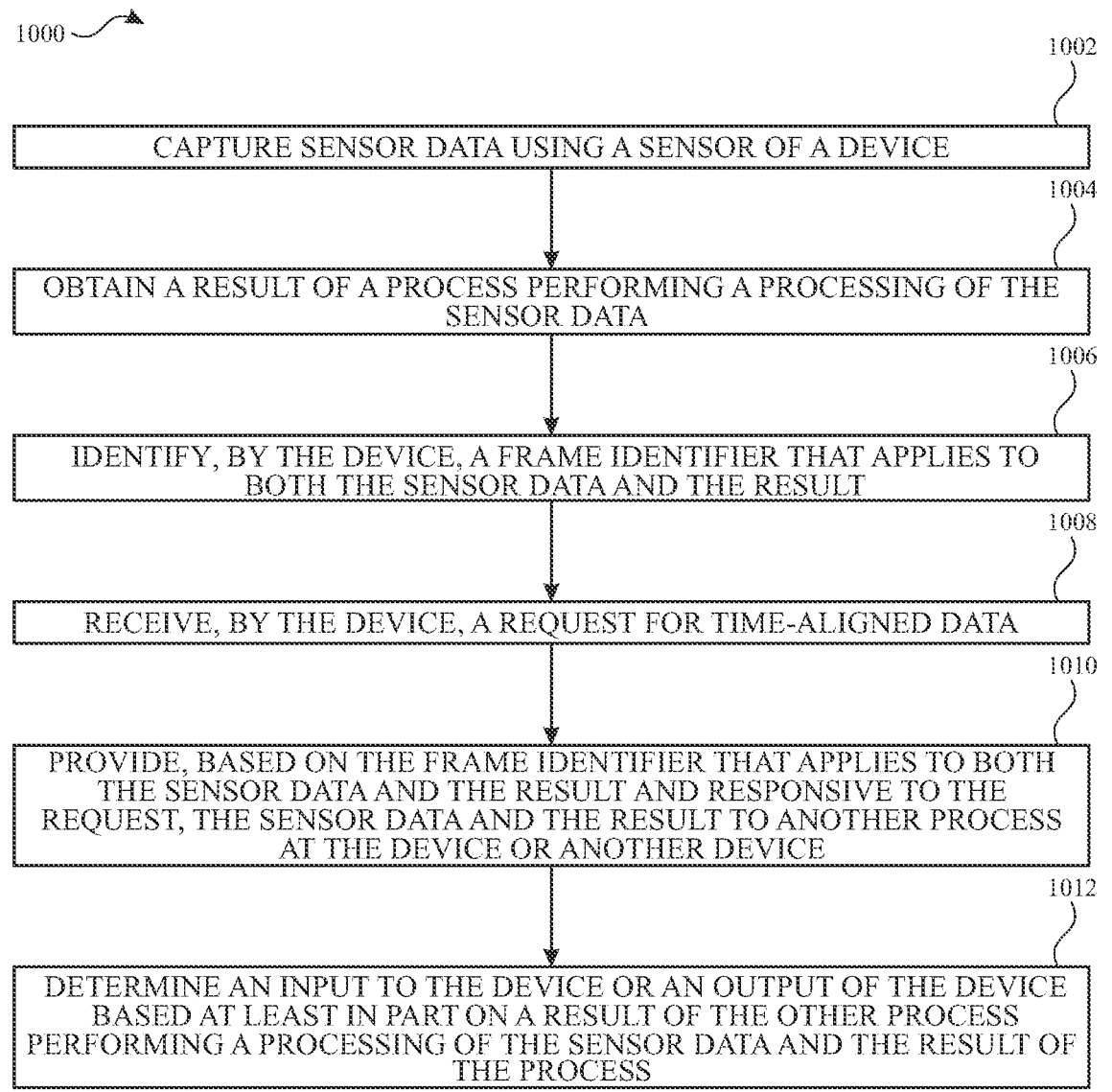
FIG. 10 illustrates an example process that may be performed for operating an electronic device based on synchronized frame identifiers, in accordance with one or more implementations.

FIG. 10 illustrates an example process 1000 for operating a device based on synchronized frame identifiers, in accordance with one or more implementations. For explanatory purposes, the process 1000 is primarily described herein with reference to the electronic device 105 of FIGS. 1 and 2. However, the process 1000 is not limited to the electronic device 105 of FIGS. 1 and 2, and one or more blocks (or operations) of the process 1000 may be performed by one or more other components of other suitable devices, including the electronic device 110, the electronic device 115, and/or the servers 120. Further for explanatory purposes, some of the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

In the example of FIG. 10, at block 1002, sensor data may be obtained by a sensor (e.g., a camera 150 or a sensor 152) of a device (e.g., electronic device 105). For example, a first image may be captured using a first image sensor of a device (e.g., electronic device 105). For example, the sensor may be a first one of the image sensors 215 of a first one of the cameras 150 of the electronic device 105. For example, the first image sensor may have a first sensor architecture and/or may be implemented in a first camera having a first camera architecture, a first primary function, and/or a first field of view. The sensor data may be captured responsive to a system pulse (e.g., one of the system pulses 300) from a system component (e.g., an oscillator 217) of the device. In one or more implementations, additional sensor data may also be obtained from one or more additional sensors.

At block 1004, the device may obtain a result (e.g., the result 710 or the result 804) of a process (e.g., process 708 or process 802) performing a processing of the sensor data. The process may also process additional sensor data along with the sensor data. For example, the additional sensor data may have the same frame identifier as the sensor data.

At block 1006, the device (e.g., the system process 600) may identify a frame identifier (e.g., frame identifier 707) that applies to both the sensor data and the result of the process. For example, identifying the frame identifier that applies to both the sensor data and the result may include:

determining the frame identifier based on a system pulse (e.g., a system pulse 300) that triggered the sensor to obtain the sensor data; and propagating the frame identifier though the process (e.g., as discussed herein in connection with FIGS. 7 and 8).

At block 1008, the device (e.g., the system process 600) may receive a request for time-aligned data. For example, the request may be received by the system process 600 from another process (e.g., the process 712 or the process 806) at the device or another device. For example, the request may be a request for time-aligned data from one or more sensors and/or one or more processes.

At block 1010, the device may provide, based on the frame identifier that applies to both the sensor data and the result and responsive to the request, the sensor data and the result (e.g., the result 710 or the result 804) to another process (e.g., the process 712 or the process 806) at the device or another device.

At block 1012, the device may determine an input to the device or an output of the device based at least in part a result (e.g., the result 716 or the result 808) of the other process performing a processing of the sensor data and the result of the process.

For example, the device may generate the result (e.g., the result 716 or the result 808) of the other process by processing the sensor data and the result (e.g., the result 710 or the result 804) of the process; provide the frame identifier and the result (e.g., the result 716 or the result 808) of the other process to a first additional process (e.g., the process 722 or the process 810) at the device or another device; and determine the input to the device or the output of the device based at least in part on a first additional result (e.g., the output 724 or the result 812) of the first additional process. The device may also provide the frame identifier and result of the other process to a second additional process (e.g., the process 714) at the device or another device; and provide the frame identifier and a second additional result (e.g., the result 718) of the second additional process to the first additional process. As discussed herein in connection with FIG. 7, the result (e.g., the result 718) of the second additional process may be processed by the first additional process together with the result (e.g., the result 716) of the other process (e.g., when the result 716 and the result 718 have the same frame identifier).

As another example, the device may generate the result (e.g., the result 808) of the other process (e.g., the process 806) by processing the sensor data and the result (e.g., the result 804) of the process (e.g., the process 802); provide the frame identifier and the result (e.g., the result 808) of the other process to a first additional process (e.g., the process 810) at the device or another device; provide the frame identifier (e.g., the frame identifier 707) and the sensor data to the first additional process; process, by the first additional process, the sensor data and the result (e.g., the result 808) of the other process to generate a first additional result (e.g., the result 812); and determine the input to the device or the output of the device based at least in part on the first additional result (e.g., the result 812) of the first additional process. In one or more implementations, the device may also provide the frame identifier (e.g., the frame identifier 707) and the first additional result (e.g., the result 812) of the first additional process to a second additional process (e.g., the process 814) at the device; provide the frame identifier and the sensor data to the second additional process; process, by the second additional process, the sensor data and the first additional result of the first additional process to generate a second additional result (e.g., the output 816); and determine the input to the device or the output of the device based at least in part on the second additional result of the second additional process.

As described above, one aspect of the present technology is the gathering and use of data available from specific and legitimate sources for providing image synchronization for multiple cameras. The present disclosure contemplates that in some instances, this gathered data may include personal information data that uniquely identifies or can be used to identify a specific person. Such personal information data can include audio data, voice data, demographic data, location-based data, online identifiers, telephone numbers, email addresses, home addresses, encryption information, data or records relating to a user's health or level of fitness (e.g., vital signs measurements, medication information, exercise information), date of birth, or any other personal information.

The present disclosure recognizes that the use of personal information data, in the present technology, can be used to the benefit of users. For example, the personal information data can be used for providing image synchronization for multiple cameras.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the image synchronization for multiple cameras, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 11:
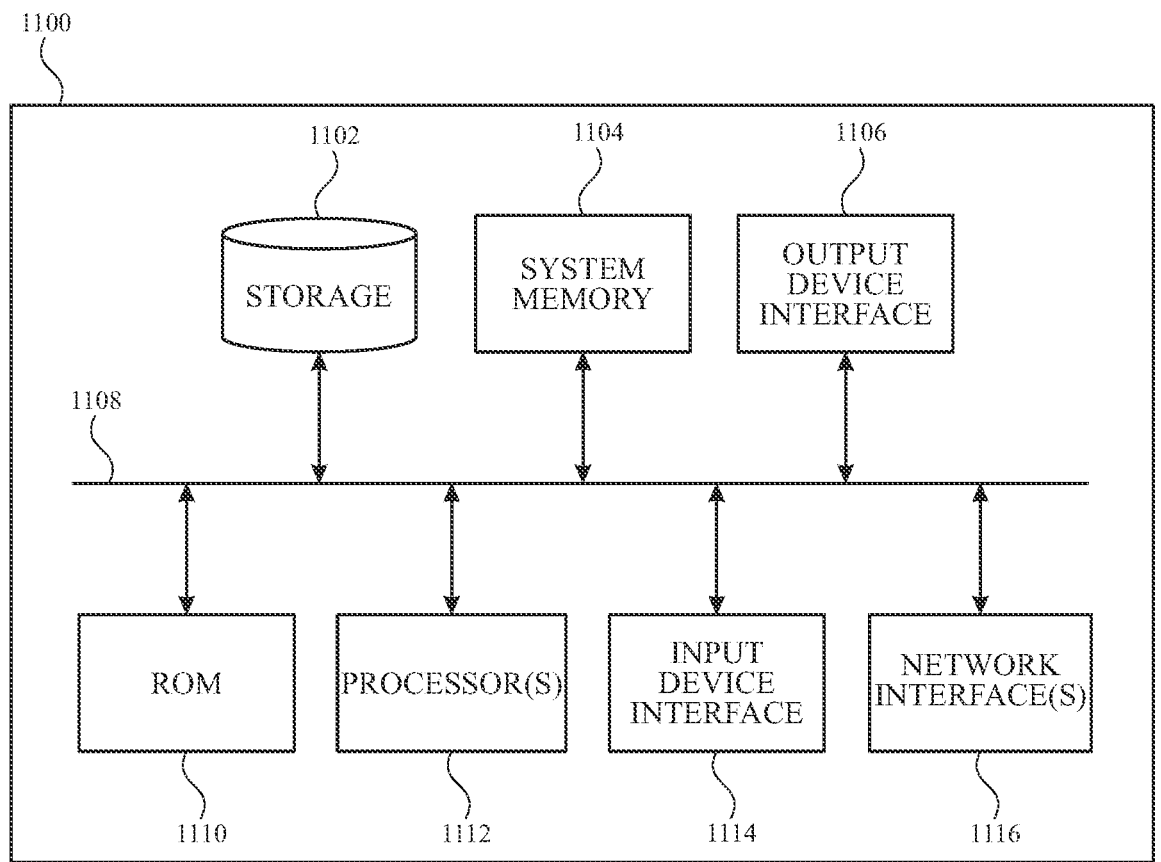
FIG. 11 illustrates an electronic system with which one or more implementations of the subject technology may be implemented.

FIG. 11 illustrates an electronic system 1100 with which one or more implementations of the subject technology may be implemented. The electronic system 1100 can be, and/or can be a part of, the electronic device 105, the handheld electronic device 104, the electronic device 110, the electronic device 115, and/or the server 120 as shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110 (which are each implemented as a non-transitory computer-readable medium). From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"). The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes, such as the electronic device 110 shown in FIG. 1, through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
obtaining first sensor data using a first sensor of a device, wherein the first sensor comprises an image sensor and the first sensor data comprises image data;
obtaining second sensor data using a second sensor of the device;
identifying, by the device, a frame identifier that applies to both the first sensor data and the second sensor data;
receiving, by the device, a request for time-aligned data;
providing, based on the frame identifier that applies to both the first sensor data and the second sensor data and responsive to the request, the first sensor data and the second sensor data to a process at the device or another device, wherein the process comprises at least one of a gesture detector, a hand tracker, or an object detector;
generating a result of the process by processing the first sensor data and the second sensor data;
providing the frame identifier and the result of the process to a first additional process at the device or the other device; and

determining an input to the device or an output of the device based at least in part on a first additional result of the first additional process.

2. The method of claim 1, wherein identifying the frame identifier that applies to both the first sensor data and the second sensor data comprises determining the frame identifier based on a system pulse that triggered the first sensor to obtain the first sensor data and triggered the second sensor to obtain the second sensor data, and wherein providing the first sensor data and the second sensor data to the process comprises providing the frame identifier to the process with each of the first sensor data and the second sensor data.

3. The method of claim 1, further comprising:
providing the frame identifier and the result of the process to a second additional process at the device or the other device; and
determining the input to the device or the output of the device based at least in part on the first additional result of the first additional process and a second additional result of the second additional process.

4. The method of claim 3, further comprising:
providing the frame identifier and the first additional result from the first additional process to a third additional process at the device or the other device;
providing the frame identifier and the second additional result from the second additional process to the third additional process at the device or the other device; and
determining, by the third additional process, the input to the device or the output of the device based at least in part on the first additional result of the first additional process the second additional result of the second additional process.

5. The method of claim 1, further comprising:
providing the frame identifier, the first sensor data, and the second sensor data to the first additional process; and
processing, by the first additional process, the first sensor data, the second sensor data, and the result of the process to generate the first additional result.

6. The method of claim 5, further comprising:
providing the frame identifier and the first additional result of the first additional process to a second additional process at the device or the other device;
providing the frame identifier, the first sensor data, and the second sensor data to the second additional process;
processing, by the second additional process, the first sensor data, the second sensor data, and the first additional result of the first additional process to generate a second additional result; and
determining the input to the device or the output of the device based at least in part on the second additional result of the second additional process.

7. The method of claim 1, wherein the first sensor comprises a first image sensor, wherein the first sensor data comprises a first image, wherein the second sensor comprises a second image sensor, wherein the second sensor data comprises a second image, and wherein identifying the frame identifier that applies to both the first sensor data and the second sensor data comprises:
obtaining a first offset time for the first image sensor;
obtaining a second offset time for the second image sensor;
determining a first frame identifier for the first image based on the first offset time and a time of a first system pulse that triggered the obtaining of the first sensor data; and
determining a second frame identifier for the second image based on the second offset time and the time of the first system pulse, wherein the first frame identifier is the same as the second frame identifier.

8. The method of claim 7, wherein obtaining the first offset time comprises determining the first offset time based on a predetermined exposure time and a predetermined readout time for the first image sensor, and wherein obtaining the second offset time comprises determining the second offset time based on a predetermined exposure time and a predetermined readout time for the second image sensor.

9. The method of claim 1, wherein:
determining the input to the device comprises detecting a feature of a physical environment of the device based at least in part on the first additional result of the first additional process; and
determining the output of the device comprises generating display content for display by a display of the device based at least in part on the first additional result of the first additional process.

10. The method of claim 1, wherein identifying the frame identifier comprises identifying the frame identifier by a first system process of the device, wherein the process comprises a second system process or an application process at the device, and wherein the request comprises a request from the second system process or the application process to the first system process.

11. The method of claim 1, wherein identifying the frame identifier comprises identifying the frame identifier by a first system process of the device, wherein the process comprises a second system process or an application process at another device, and wherein the request comprises a request from the second system process or the application process to the first system process.

12. A non-transitory machine readable medium comprising instructions which, when executed by one or more processors, causes the one or more processors to perform operations comprising:
capturing sensor data using a sensor of a device, wherein the sensor comprises an image sensor and the sensor data comprises image data;
obtaining a result of a process performing a processing of the sensor data, wherein the process comprises at least one of a gesture detector, a hand tracker, or an object detector;
identifying, by the device, a frame identifier that applies to both the sensor data and the result;
receiving, by the device, a request for time-aligned data;
providing, based on the frame identifier that applies to both the sensor data and the result and responsive to the request, the sensor data and the result to another process at the device or another device; and
determining an input to the device or an output of the device based at least in part a result of the other process performing a processing of the sensor data and the result of the process.

13. The non-transitory machine readable medium of claim 12, wherein identifying the frame identifier that applies to both the sensor data and the result comprises:
determining the frame identifier based on a system pulse that triggered the sensor to obtain the sensor; and
propagating the frame identifier though the process.

14. The non-transitory machine readable medium of claim 12, further comprising:
generating the result of the other process by processing the sensor data and the result of the process;
providing the frame identifier and the result of the other process to a first additional process at the device or another device; and determining the input to the device or the output of the device based at least in part on a first additional result of the first additional process.

15. The non-transitory machine readable medium of claim 14, the operations further comprising:
providing the frame identifier and result of the other process to a second additional process at the device or another device; and
providing the frame identifier and a second additional result of the second additional process to the first additional process.

16. The non-transitory machine readable medium of claim 12, the operations further comprising:
generating the result of the other process by processing the sensor data and the result of the process;
providing the frame identifier and the result of the other process to a first additional process at the device or another device;
providing the frame identifier and the sensor data to the first additional process;
processing, by the first additional process, the sensor data and the result of the other process to generate a first additional result; and
determining the input to the device or the output of the device based at least in part on the first additional result of the first additional process.

17. The non-transitory machine readable medium of claim 16, the operations further comprising:
providing the frame identifier and the first additional result of the first additional process to a second additional process at the device;
providing the frame identifier and the sensor data to the second additional process;
processing, by the second additional process, the sensor data and the first additional result of the first additional process to generate a second additional result; and
determining the input to the device or the output of the device based at least in part on the second additional result of the second additional process.

18. A device comprising:
a first sensor;
a second sensor;
a memory; and
at least one processor configured to:
obtain first sensor data the first sensor, wherein the first sensor comprises an image sensor, the first sensor data comprises image data;
obtain second sensor data using the second sensor;
identify a frame identifier that applies to both the first sensor data and the second sensor data;
receive a request for time-aligned data;
provide, based on the frame identifier that applies to both the first sensor data and the second sensor data and responsive to the request, the first sensor data and the second sensor data to a process at the device or another device, wherein the process comprises at least one of a gesture detector, a hand tracker, or an object detector;
provide, to at least one additional process at the device, the frame identifier and a result of the process performing a processing of the first sensor data and the second sensor data; and
determine an input to the device or an output of the device based at least in part on a result of the at least one additional process performing a processing of the result of the process.

19. The device of claim 18, wherein the at least one processor is configured to identify the frame identifier that applies to both the first sensor data and the second sensor data by determining the frame identifier based on a system pulse that triggered the first sensor to capture the first sensor data and triggered the second sensor to capture the second sensor data.

20. The device of claim 19, wherein the first sensor comprises a first image sensor, wherein the first sensor data comprises a first image, wherein the second sensor comprises a second image sensor, wherein the second sensor data comprises a second image, and wherein the at least one processor is configured to determine the frame identifier based on the system pulse, a first offset time corresponding to the first image sensor, and a second offset time, different from the first offset time, corresponding to the second image sensor.

21. The device of claim 18, wherein:

the determination of the input to the device comprises a detection of a feature of a physical environment of the device based at least in part on the result of the at least one additional process; and the determination of the output of the device comprises a generation of display content for display by a display of the device based at least in part on the result of the at least one additional process.

22. The method of claim 1, wherein the process comprises a hand tracker configured to track a location of a hand of a user based on the first sensor data and the second sensor data, and wherein the first additional process comprises a user-interface interaction detector configured to detect a user interaction with a user interface element based on the location of the hand from the hand tracker.

23. The method of claim 1, wherein the process comprises an object detector configured to detect an object in a physical environment of the device using the first sensor data and the second sensor data, wherein the result of the process comprises an indication of a detected object, and wherein the first additional process comprises an attribute detector configured to identify one or more attributes of the detected object based on the first sensor data, the second sensor data, and the indication of the detected object.

24. The non-transitory machine readable medium of claim 12, wherein the sensor comprises an image sensor, the sensor data comprises image data, and the process comprises at least one of a gesture detector, a hand tracker, or an object detector.

\*   \*   \*   \*   \*